US012690006B2

(12) United States Patent      (10) Patent No.: US 12,690,006 B2

Gao et al.      (45) Date of Patent: Jul. 21, 2026

(54) COMMUNICATION METHOD AND APPARATUS

(71) Applicant: HUAWEI TECHNOLOGIES CO., LTD., Shenzhen (CN)

(72) Inventors: Xin Gao, Beijing (CN); Su Huang, Shanghai (CN); Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 18/477,488

(22) Filed: Sep. 28, 2023

(65) Prior Publication Data

US 2024/0023058 A1     Jan. 18, 2024

Related U.S. Application Data

(63) Continuation of application No. PCT/CN2022/083790, filed on Mar. 29, 2022.

(30) Foreign Application Priority Data

Apr. 2, 2021   (CN) .......................... 202110362322.0

(51) Int. Cl.
    *H04W 64/00*     (2009.01)
    *H04L 5/00*     (2006.01)

(52) U.S. Cl.
    CPC ......... *H04W 64/003* (2013.01); *H04L 5/0035* (2013.01); *H04L 5/0048* (2013.01)

(58) Field of Classification Search
    CPC ..... H04W 64/003; H04W 64/00; H04W 4/02; H04W 72/046; H04W 72/0473;

(Continued)

(56) References Cited

U.S. PATENT DOCUMENTS

2004/0176107 A1*  9/2004  Chadha ................. H04W 4/021
                                  455/457
2014/0295883 A1*  10/2014  Kang .................... G01S 5/0295
                                 455/456.1

(Continued)

FOREIGN PATENT DOCUMENTS

CN     105589506 A    5/2016
CN     105850189 A    8/2016
CN     109844558 A    6/2019

OTHER PUBLICATIONS

Moderator (Intel Corporation), "Summary of E-mail Discussion [104-e-NR-Pos-01]." 3GPP TSG RAN WG1 Meeting #104-E R1-2101836 e-Meeting, Jan. 25-Feb. 5, 2021, 28 pages.

(Continued)

*Primary Examiner* — Nimesh Patel

(74) *Attorney, Agent, or Firm* — Fish & Richardson P.C.

(57) ABSTRACT

Embodiments of this application disclose communication methods and apparatuses for positioning. One method includes: receiving, by a terminal device, positioning reference signal configuration information, wherein the positioning reference signal configuration information comprises at least one of a physical cell identifier or a cell global identifier, determining whether a first condition is satisfied, and in response to determining that the first condition is satisfied, determining that a positioning reference signal corresponding to the positioning reference signal configuration information is from a serving cell.

20 Claims, 8 Drawing Sheets

(58) Field of Classification Search

CPC ... H04W 4/029; H04W 24/08; H04W 56/001;
H04W 72/0453; H04W 64/006; H04W
4/024; H04W 4/025; H04W 4/027; H04W
4/06; H04W 4/20; H04W 60/04; H04W
52/325; H04W 52/40; H04W 76/15;
H04W 76/19; H04W 92/18; H04L
5/0035; H04L 5/0048; H04L 5/001; H04L
5/0091; H04L 5/005; G01S 5/021; G01S
17/88; G01S 5/0244; G01S 11/06; G01S
5/0009; G01S 5/0268; G01S 19/05; G01S
19/45; G01S 5/0252; G01S 19/40; G01S
19/42; G01S 5/0027; G01S 1/02; G01S
17/08; G01S 17/42; G01S 19/07; G01S
19/10; G01S 5/0054; G06V 10/245;
G06V 20/10; G06V 30/1448; G06V
2201/06; G06V 30/1473; G06V 30/19173

See application file for complete search history.

(56) References Cited

U.S. PATENT DOCUMENTS

| | | | |
|---|---|---|---|
| 2015/0334669 A1* | 11/2015 | Zhang | H04L 27/2646 |
| | | | 370/336 |
| 2017/0201960 A1 | 7/2017 | Park et al. | |
| 2017/0318522 A1* | 11/2017 | Ly | H04W 48/16 |
| 2018/0077670 A1* | 3/2018 | Jain | H04W 64/00 |
| 2020/0235877 A1* | 7/2020 | Manolakos | H04W 4/70 |
| 2021/0050963 A1* | 2/2021 | Zarifi | H04W 24/10 |
| 2023/0148057 A1* | 5/2023 | Dong | G01S 5/0236 |
| | | | 455/456.1 |
| 2024/0012087 A1* | 1/2024 | Pietraski | G06N 3/045 |

OTHER PUBLICATIONS

Office Action in Japanese Appln. No. 2023-560648, mailed on Oct. 8, 2024, 8 pages (with English translation).

Huawei et al., "Correction to the procedure to determine the cell of PRS," 3GPP TSG-RAN WG1 Meeting #104bis-e, R1-2102347, E-Meeting, Apr. 12-20, 2021, 3 pages.

Notice of Allowance in Japanese Appln. No. 2023-560648, mailed on Mar. 25, 2025, 6 pages (with English translation).

3GPP TS 38.214 V16.5.0, "3rd Generation Partnership Project; Technical Specification Group Radio Access Network; NR; Physical layer procedures for data (Release 16)," Mar. 2021, 171 pages.

Vivo, "Discussion on physical-layer procedures for UE/gNB measurements," 3GPP TSG RAN WG1 #97, R1-1906180 May 13-17, 2019, 6 pages.

Extended European Search Report in European Appln No. 22778959. 1, dated Aug. 2, 2024, 9 pages.

3GPP TS 37.355 V16.4.0, "3rd Generation Partnership Project; Technical Specification Group Radio Access Network; LTE Positioning Protocol (LPP)(Release 16)," Mar. 2021, 295 pages.

3GPP TS 38.305 V16.4.0, "3rd Generation Partnership Project; Technical Specification Group Radio Access Network; NG Radio Access Network (NG-RAN); Stage 2 functional specification of User Equipment (UE) positioning in NG-RAN (Release 16)," Mar. 2021, 119 pages.

3GPP TS 38.211 V16.5.0, "3rd Generation Partnership Project; Technical Specification Group Radio Access Network; NR; Physical channels and modulation (Release 16)," Mar. 2021, 129 pages.

3GPP TS 38.331 V16.4.1, "3rd Generation Partnership Project; Technical Specification Group Radio Access Network; NR; Radio Resource Control (RRC) protocol specification (Release 16)," Mar. 2021, 946 pages.

International Search Report and Written Opinion in International Appln. No. PCT/CN2022/083790, mailed on Jun. 10, 2022, 13 pages (with English translation).

* cited by examiner

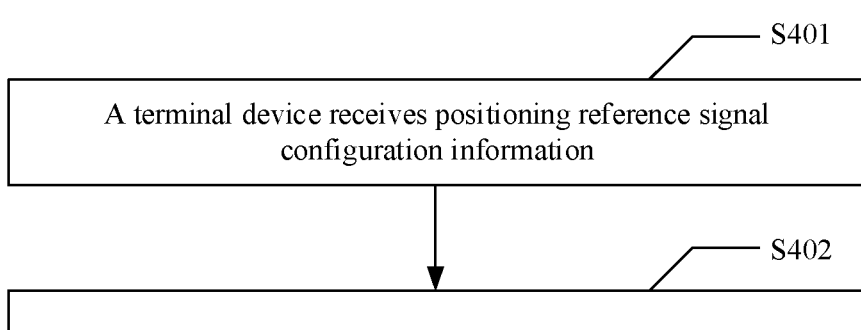

S401

A terminal device receives positioning reference signal configuration information

S402

When the positioning reference signal configuration information includes a physical cell identifier and/or a cell global identifier, if a first condition is met, the terminal device determines that a positioning reference signal corresponding to the positioning reference signal configuration information is from a serving cell

FIG. 4

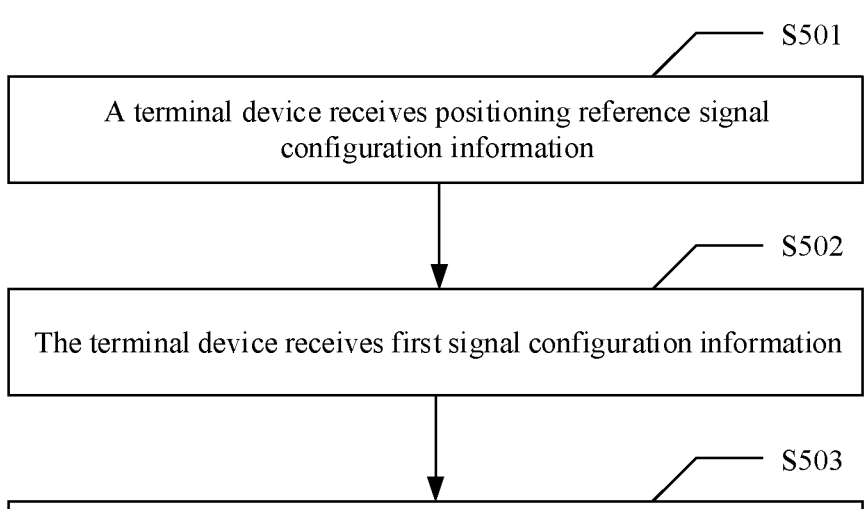

S501

A terminal device receives positioning reference signal configuration information

S502

The terminal device receives first signal configuration information

S503

When the positioning reference signal configuration information includes a physical cell identifier and/or a cell global identifier, if a fourth condition is met, the terminal device determines that a positioning reference signal corresponding to the positioning reference signal configuration information and a first signal corresponding to the first signal configuration information are from a same serving cell

FIG. 5

Communication system 700

Communication apparatus 900

COMMUNICATION METHOD AND APPARATUS

CROSS-REFERENCE TO RELATED APPLICATIONS

This application is a continuation of International Application No. PCT/CN2022/083790, filed on Mar. 29, 2022, which claims priority to Chinese Patent Application No. 202110362322.0, filed on Apr. 2, 2021. The disclosures of the aforementioned applications are hereby incorporated by reference in their entireties.

TECHNICAL FIELD

This application relates to the field of wireless communication technologies, and in particular, to a communication method and apparatus.

BACKGROUND

In a positioning scenario, a network device can deliver positioning reference signal (positioning reference signal, PRS) configuration information. A terminal device can determine, based on the PRS configuration information, a transmission point from which each PRS is, then measure time (differences) of arrival or angles of arrival of a plurality of PRSs, determine distances (differences) or angles of arrival between the terminal device and transmission points, and determine a location of the terminal device based on coordinates of the transmission points. Therefore, the location of the terminal device can be calculated based on information carried in the PRS configuration information. The PRS configuration information does not include additional indication information.

However, in difference cases of processing of a collision between the PRS and another signal, and open-loop power control processing and spatial relation configuration processing of an uplink positioning reference signal, whether the PRS is from a serving cell or a non-serving cell needs to be further determined. However, because whether the PRS is from the serving cell or the non-serving cell cannot be determined in the conventional technology, the collision between the PRS and the another signal cannot be accurately processed, and power and a beam of the uplink positioning reference signal cannot be accurately configured, resulting in low positioning accuracy and poor positioning performance.

SUMMARY

Embodiments of this application provide a communication method and apparatus, to improve positioning accuracy and positioning performance.

According to a first aspect, a communication method is provided, including the following processes: A terminal device receives positioning reference signal configuration information. When the positioning reference signal configuration information includes a physical cell identifier and/or a cell global identifier, if a first condition is met, the terminal device determines that a positioning reference signal corresponding to the positioning reference signal configuration information is from a serving cell.

In the method, when the positioning reference signal configuration information includes the physical cell identifier and/or the cell global identifier, the terminal device may determine, based on the physical cell identifier and/or the cell global identifier included in the positioning reference signal configuration information, that the positioning reference signal corresponding to the positioning reference signal configuration information is from the serving cell, to accurately process a collision between the positioning reference signal and another signal, and accurately configure power and a beam of an uplink positioning signal. This improves positioning accuracy and positioning performance.

In a possible implementation, when the positioning reference signal configuration information includes the physical cell identifier and/or the cell global identifier, if a second condition is met, the terminal device may alternatively determine that a positioning reference signal corresponding to the positioning reference signal configuration information is from a non-serving cell. When the positioning reference signal configuration information includes the physical cell identifier and/or the cell global identifier, the terminal device may alternatively determine that a positioning reference signal corresponding to the positioning reference signal configuration information is from a serving cell, to accurately process a collision between the positioning reference signal and another signal, and accurately configure power and a beam of an uplink positioning signal. This improves positioning accuracy and positioning performance.

In a possible implementation, when a third condition is met, the terminal device may alternatively determine that a positioning reference signal corresponding to the positioning reference signal configuration information is not associated with any cell. The third condition includes that the positioning reference signal configuration information does not include a physical cell identifier and a cell global identifier. If the positioning reference signal is not associated with any cell, the positioning reference signal and another signal are not from a same serving cell or a same non-serving cell, in other words, the positioning reference signal does not collide with the another signal. This can further improve positioning accuracy and positioning performance.

In a possible implementation, the first condition includes: The physical cell identifier is the same as a physical cell identifier of the serving cell, and a band on which the positioning reference signal is located is the same as a band corresponding to the serving cell; the physical cell identifier is the same as the physical cell identifier of the serving cell; and/or the cell global identifier is the same as a cell global identifier of the serving cell. In the positioning reference signal configuration information, the physical cell identifier, the cell global identifier, and an ARFCN (for determining the band on which the positioning reference signal is located) are optional parameters. The terminal device may compare a parameter provided in the positioning reference signal configuration information with a parameter corresponding to the serving cell, to determine that the positioning reference signal corresponding to the positioning reference signal configuration information is from the serving cell.

In a possible implementation, when the positioning reference signal configuration information further includes an absolute radio frequency channel number ARFCN, if the ARFCN included in the positioning reference signal configuration information is the same as an ARFCN of the serving cell, the terminal device may alternatively determine that a band on which the positioning reference signal is located is the same as a band corresponding to the serving cell. This can further improve positioning accuracy and positioning performance.

In a possible implementation, the first condition may include: When the positioning reference signal configuration information includes the physical cell identifier, the physical cell identifier is the same as a physical cell identifier of the serving cell;

when the positioning reference signal configuration information includes the cell global identifier, the cell global identifier is the same as a cell global identifier of the serving cell;

when the positioning reference signal configuration information includes the physical cell identifier and the cell global identifier, the physical cell identifier is the same as a physical cell identifier of the serving cell, and the cell global identifier is the same as a cell global identifier of the serving cell;

when the positioning reference signal configuration information includes the physical cell identifier and an absolute radio frequency channel number, the physical cell identifier is the same as a physical cell identifier of the serving cell, and the absolute radio frequency channel number is the same as an absolute radio frequency channel number of the serving cell; or when the positioning reference signal configuration information includes the cell global identifier and an absolute radio frequency channel number, the cell global identifier is the same as a cell global identifier of the serving cell, and the absolute radio frequency channel number is the same as an absolute radio frequency channel number of the serving cell; or when the positioning reference signal configuration information includes the physical cell identifier, the cell global identifier, and an absolute radio frequency channel number, the physical cell identifier is the same as a physical cell identifier of the serving cell, the cell global identifier is the same as a cell global identifier of the serving cell, and the absolute radio frequency channel number is the same as an absolute radio frequency channel number of the serving cell.

In a possible implementation, the second condition is that: The first condition is not met, and the third condition is not met. For example, the second condition includes one or more of the following: The physical cell identifier is different from the physical cell identifier of the serving cell; the physical cell identifier is the same as a physical cell identifier of the non-serving cell, and the band on which the positioning reference signal is located is the same as a band corresponding to the non-serving cell; and the cell global identifier is the same as a cell global identifier of the non-serving cell. The terminal device may determine, based on the parameter provided in the positioning reference signal configuration information, that the positioning reference signal is from the non-serving cell. This improves positioning accuracy and positioning performance.

In a possible implementation, when the positioning reference signal configuration information includes the physical cell identifier and/or the cell global identifier, if a first condition is not met, the terminal device determines that a positioning reference signal corresponding to the positioning reference signal configuration information is from a non-serving cell.

In a possible implementation, the terminal device may further receive first signal configuration information, where the first signal configuration information includes a physical cell identifier. When a fourth condition is met, the terminal device determines, based on the physical cell identifier included in the first signal configuration information, that the positioning reference signal corresponding to the positioning reference signal configuration information and a first signal corresponding to the first signal configuration information are from the same serving cell. When a fifth condition is met, the terminal device determines, based on the physical cell identifier included in the first signal configuration information, that the positioning reference signal corresponding to the positioning reference signal configuration information and a first signal corresponding to the first signal configuration information are from the same non-serving cell. The terminal device may determine that the positioning reference signal and the first signal are from the same serving cell or the same non-serving cell, to accurately process a collision between the positioning reference signal and another signal. This further improves positioning accuracy and positioning performance.

For example, the first signal is a synchronization signal block.

In a possible implementation, the fourth condition includes: The positioning reference signal is from the serving cell, and a band on which the positioning reference signal is located is the same as a band on which the first signal is located. The terminal device may compare a parameter provided in the positioning reference signal configuration information with a parameter provided in the first signal configuration information, to determine that the positioning reference signal and the first signal are from the same serving cell. This can further improve positioning accuracy and positioning performance.

In a possible implementation, the fourth condition includes: The positioning reference signal is from the serving cell, and a physical cell identifier corresponding to the positioning reference signal is the same as a physical cell identifier corresponding to the first signal.

In other words, in this implementation, the terminal device may receive first signal configuration information, where the first signal configuration information includes a physical cell identifier. If the positioning reference signal corresponding to the positioning reference signal configuration information is from the serving cell, and the physical cell identifier corresponding to the positioning reference signal is the same as the physical cell identifier included in the first signal configuration information, the terminal device determines that the positioning reference signal and a first signal corresponding to the first signal configuration information are from the same serving cell.

In a possible implementation, the fourth condition includes: The positioning reference signal is from the serving cell, a physical cell identifier corresponding to the positioning reference signal is the same as a physical cell identifier corresponding to the first signal, and a band on which the positioning reference signal is located is the same as a band on which the first signal is located. This can further improve positioning accuracy and positioning performance.

In other words, in this implementation, the terminal device receives first signal configuration information, where the first signal configuration information includes a physical cell identifier. If the positioning reference signal corresponding to the positioning reference signal configuration information is from the serving cell, the physical cell identifier corresponding to the positioning reference signal is the same as the physical cell identifier included in the first signal configuration information, and a band on which the positioning reference signal is located is the same as a band on which a first signal corresponding to the first signal configuration information is located, the terminal device determines that the positioning reference signal and the first signal are from the same serving cell.

Optionally, the fourth condition further includes that the first signal is from the serving cell.

In a possible implementation, the fifth condition includes: The positioning reference signal is from the non-serving cell, and a physical cell identifier corresponding to the positioning reference signal is the same as a physical cell identifier corresponding to the first signal. The terminal device may compare a parameter provided in the positioning reference signal configuration information with a parameter provided in the first signal configuration information, to determine that the positioning parameter signal and the first signal are from the same non-serving cell. This can further improve positioning accuracy and positioning performance.

Optionally, the fifth condition further includes that the first signal is from the non-serving cell.

In a possible implementation, the fifth condition includes: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located. The terminal device may compare a parameter provided in the positioning reference signal configuration information with a parameter provided in the first signal configuration information, to determine that the positioning reference signal and the first signal are from the same non-serving cell. This can further improve positioning accuracy and positioning performance.

In other words, in this implementation, the terminal device may receive first signal configuration information, where the first signal configuration information includes a physical cell identifier. If the positioning reference signal is from the non-serving cell, the physical cell identifier included in the positioning reference signal configuration information is the same as the physical cell identifier included in the first signal configuration information, and a band on which the positioning reference signal is located is the same as a band on which a first signal corresponding to the first signal configuration information is located, the terminal device determines that the positioning reference signal and the first signal are from the same non-serving cell.

Optionally, the fifth condition further includes that the first signal is from the non-serving cell.

According to a second aspect, a communication method is provided, including the following processes: A terminal device receives positioning reference signal configuration information. The terminal device receives first signal configuration information. The first signal configuration information includes a physical cell identifier. When the positioning reference signal configuration information includes a physical cell identifier and/or a cell global identifier, if a fourth condition is met, the terminal device determines that a positioning reference signal corresponding to the positioning reference signal configuration information and a first signal corresponding to the first signal configuration information are from a same serving cell.

In a possible implementation, when the positioning reference signal configuration information includes the physical cell identifier and/or the cell global identifier, if a fifth condition is met, the terminal device may alternatively determine that a positioning reference signal corresponding to the positioning reference signal configuration information and a first signal corresponding to the first signal configuration information are from a same non-serving cell.

Optionally, the positioning reference signal configuration information may alternatively include a cell global identifier.

In a possible implementation, the first signal is a synchronization signal block.

In a possible implementation, the fourth condition includes: The positioning reference signal is from the serving cell, and a band on which the positioning reference signal is located is the same as a band on which the first signal is located. Optionally, the fourth condition further includes that the first signal is from the serving cell.

In a possible implementation, the fourth condition includes: The positioning reference signal is from the serving cell, and a physical cell identifier corresponding to the positioning reference signal is the same as a physical cell identifier corresponding to the first signal.

In a possible implementation, the fourth condition includes: The positioning reference signal is from the serving cell, a physical cell identifier corresponding to the positioning reference signal is the same as a physical cell identifier corresponding to the first signal, and a band on which the positioning reference signal is located is the same as a band on which the first signal is located.

In a possible implementation, the fifth condition includes: The positioning reference signal is from the non-serving cell, and a physical cell identifier corresponding to the positioning reference signal is the same as a physical cell identifier corresponding to the first signal. Optionally, the fifth condition further includes that the first signal is from the non-serving cell.

In a possible implementation, the fifth condition includes: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located. Optionally, the fifth condition further includes that the first signal is from the non-serving cell.

According to a third aspect, a communication method is provided, including the following processes: A terminal device receives positioning reference signal configuration information. The positioning reference signal configuration information indicates that a positioning reference signal corresponding to the positioning reference signal configuration information is from a serving cell, or indicates that a positioning reference signal corresponding to the positioning reference signal configuration information is from a non-serving cell.

Optionally, the positioning reference signal configuration information includes first indication information. The first indication information indicates that the positioning reference signal corresponding to the positioning reference signal configuration information is from the serving cell, or indicates that the positioning reference signal corresponding to the positioning reference signal configuration information is from the non-serving cell.

In the method, the terminal device may directly determine, based on an indication of the positioning reference signal configuration information, that the positioning reference signal corresponding to the positioning reference signal configuration information is from the serving cell or the non-serving cell, to accurately process a collision between the positioning reference signal and another signal, and accurately configure power and a beam of an uplink positioning signal. This improves positioning accuracy and positioning performance.

According to a fourth aspect, a communication system is provided. The communication system includes a network device and a terminal device.

The network device is configured to send positioning reference signal configuration information.

The terminal device is configured to: receive the positioning reference signal configuration information; and when the positioning reference signal configuration information includes a physical cell identifier and/or a cell global identifier, if a first condition is met, determine that a positioning reference signal corresponding to the positioning reference signal configuration information is from a serving cell.

In a possible implementation, when the positioning reference signal configuration information includes the physical cell identifier and/or the cell global identifier, if a second condition is met, a positioning reference signal corresponding to the positioning reference signal configuration information is from a non-serving cell.

In a possible implementation, the terminal device is further configured to: when a third condition is met, determine that a positioning reference signal corresponding to the positioning reference signal configuration information is not associated with any cell. The third condition includes that the positioning reference signal configuration information does not include a physical cell identifier and a cell global identifier.

In a possible implementation, the first condition includes: The physical cell identifier is the same as a physical cell identifier of the serving cell, and a band on which the positioning reference signal is located is the same as a band corresponding to the serving cell; the physical cell identifier is the same as the physical cell identifier of the serving cell; and/or the cell global identifier is the same as a cell global identifier of the serving cell.

In a possible implementation, the terminal device is further configured to: when the positioning reference signal configuration information further includes an absolute radio frequency channel number ARFCN, if the ARFCN included in the positioning reference signal configuration information is the same as an ARFCN of the serving cell, determine that a band on which the positioning reference signal is located is the same as a band corresponding to the serving cell.

In a possible implementation, the first condition may include: When the positioning reference signal configuration information includes the physical cell identifier, the physical cell identifier is the same as a physical cell identifier of the serving cell;

when the positioning reference signal configuration information includes the cell global identifier, the cell global identifier is the same as a cell global identifier of the serving cell;

when the positioning reference signal configuration information includes the physical cell identifier and the cell global identifier, the physical cell identifier is the same as a physical cell identifier of the serving cell, and the cell global identifier is the same as a cell global identifier of the serving cell;

when the positioning reference signal configuration information includes the physical cell identifier and an absolute radio frequency channel number, the physical cell identifier is the same as a physical cell identifier of the serving cell, and the absolute radio frequency channel number is the same as an absolute radio frequency channel number of the serving cell; or when the positioning reference signal configuration information includes the cell global identifier and an absolute radio frequency channel number, the cell global identifier is the same as a cell global identifier of the serving cell, and the absolute radio frequency channel number is the same as an absolute radio frequency channel number of the serving cell; or when the positioning reference signal configuration information includes the physical cell identifier, the cell global identifier, and an absolute radio frequency channel number, the physical cell identifier is the same as a physical cell identifier of the serving cell, the cell global identifier is the same as a cell global identifier of the serving cell, and the absolute radio frequency channel number is the same as an absolute radio frequency channel number of the serving cell.

In a possible implementation, the second condition is that: The first condition is not met, and the third condition is not met.

In a possible implementation, the network device is further configured to send first signal configuration information. The first signal configuration information includes a physical cell identifier.

The terminal device is further configured to: receive the first signal configuration information; and when a fourth condition is met, determine, based on the physical cell identifier included in the first signal configuration information, that the positioning reference signal corresponding to the positioning reference signal configuration information and a first signal corresponding to the first signal configuration information are from the same serving cell; or when a fifth condition is met, determine, based on the physical cell identifier included in the first signal configuration information, that the positioning reference signal corresponding to the positioning reference signal configuration information and a first signal corresponding to the first signal configuration information are from the same non-serving cell.

In a possible implementation, the terminal device is further configured to: when the positioning reference signal configuration information includes the physical cell identifier and/or the cell global identifier, if a first condition is not met, determine that a positioning reference signal corresponding to the positioning reference signal configuration information is from a non-serving cell.

In a possible implementation, the first signal is a synchronization signal block.

In a possible implementation, the fourth condition includes: The positioning reference signal is from the serving cell, and a band on which the positioning reference signal is located is the same as a band on which the first signal is located.

In a possible implementation, the fourth condition includes: The positioning reference signal is from the serving cell, and a physical cell identifier corresponding to the positioning reference signal is the same as a physical cell identifier corresponding to the first signal.

In other words, the terminal device is further configured to: receive first signal configuration information, where the first signal configuration information includes a physical cell identifier; and if the positioning reference signal corresponding to the positioning reference signal configuration information is from the serving cell, and the physical cell identifier corresponding to the positioning reference signal is the same as the physical cell identifier included in the first signal configuration information, determine that the positioning reference signal and the first signal corresponding to the first signal configuration information are from the same serving cell.

In a possible implementation, the fourth condition includes: The positioning reference signal is from the serving cell, a physical cell identifier corresponding to the positioning reference signal is the same as a physical cell identifier corresponding to the first signal, and a band on which the positioning reference signal is located is the same as a band on which the first signal is located. This can further improve positioning accuracy and positioning performance.

In other words, the terminal device is further configured to: receive first signal configuration information, where the first signal configuration information includes a physical cell identifier; and if the positioning reference signal corresponding to the positioning reference signal configuration information is from the serving cell, the physical cell identifier corresponding to the positioning reference signal is the same as the physical cell identifier included in the first signal configuration information, and a band on which the positioning reference signal is located is the same as a band on which a first signal corresponding to the first signal configuration information is located, determine that the positioning reference signal and the first signal are from the same serving cell.

In a possible implementation, the fifth condition includes: The positioning reference signal is from the non-serving cell, and a physical cell identifier corresponding to the positioning reference signal is the same as a physical cell identifier corresponding to the first signal.

In a possible implementation, the fifth condition includes: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located.

In other words, the terminal device is further configured to: receive first signal configuration information, where the first signal configuration information includes a physical cell identifier; and if the positioning reference signal is from the non-serving cell, the physical cell identifier included in the positioning reference signal configuration information is the same as the physical cell identifier included in the first signal configuration information, and a band on which the positioning reference signal is located is the same as a band on which a first signal corresponding to the first signal configuration information is located, determine that the positioning reference signal and the first signal are from the same non-serving cell.

According to a fifth aspect, a communication system is provided. The communication system includes a network device and a terminal device.

The network device is configured to send positioning reference signal configuration information. The positioning reference signal configuration information indicates that a positioning reference signal corresponding to the positioning reference signal configuration information is from a serving cell, or indicates that a positioning reference signal corresponding to the positioning reference signal configuration information is from a non-serving cell.

The terminal device is configured to receive the positioning reference signal configuration information.

Optionally, the positioning reference signal configuration information includes first indication information. The first indication information indicates that the positioning reference signal corresponding to the positioning reference signal configuration information is from the serving cell, or indicates that the positioning reference signal corresponding to the positioning reference signal configuration information is from the non-serving cell.

Before sending the positioning reference signal configuration information, the network device may determine the serving cell of the terminal device, to perform a corresponding indication in the positioning reference signal configuration information.

According to a sixth aspect, a communication apparatus is provided. The apparatus provided in this application has functions of implementing the foregoing method aspect, and includes a corresponding component (means) configured to perform the steps or functions described in the foregoing method aspect. The steps or the functions may be implemented by software, hardware (for example, a circuit), or a combination of hardware and software.

In a possible design, the apparatus includes one or more processors and a communication unit. The one or more processors are configured to support the apparatus in implementing a function in the foregoing method.

Optionally, the apparatus may further include one or more memories. The memory is configured to be coupled to the processor, and the memory stores program instructions and/or data necessary for the apparatus. The one or more memories may be integrated with the processor, or may be disposed separately from the processor. This is not limited in this application.

In another possible design, the apparatus includes a transceiver, a processor, and a memory. The processor is configured to control a transceiver or an input/output circuit to receive and send a signal. The memory is configured to store a computer program. The processor is configured to run the computer program in the memory, so that the apparatus performs the method in any one of the first aspect, the second aspect, and the third aspect, or the possible implementations of the first aspect, the second aspect, and the third aspect.

In a possible design, the apparatus includes one or more processors and a communication unit. The one or more processors are configured to support the apparatus in implementing a function in the foregoing method.

Optionally, the apparatus may further include one or more memories. The memory is configured to be coupled to the processor, and the memory stores program instructions and/or data necessary for the terminal device. The one or more memories may be integrated with the processor, or may be disposed separately from the processor. This is not limited in this application.

In another possible design, the apparatus includes a transceiver, a processor, and a memory. The processor is configured to control a transceiver or an input/output circuit to receive and send a signal. The memory is configured to store a computer program. The processor is configured to run the computer program in the memory, so that the apparatus performs the method in any one of the first aspect, the second aspect, and the third aspect, or the possible implementations of the first aspect, the second aspect, and the third aspect.

According to a seventh aspect, a computer-readable storage medium is provided. The computer-readable storage medium is configured to store a computer program. The computer program includes instructions used to perform the method in any one of the first aspect, the second aspect, and the third aspect, or the possible implementations of the first aspect, the second aspect, and the third aspect.

According to an eighth aspect, a computer program product is provided. The computer program product includes computer program code. When the computer program code is run on a computer, the computer is enabled to perform the method in any one of the first aspect, the second aspect, and the third aspect, or the possible implementations of the first aspect, the second aspect, and the third aspect.

According to a ninth aspect, a chip system is provided. The chip system includes a transceiver, configured to implement functions in the methods in the foregoing aspects, for example, receive or send data and/or information in the foregoing methods.

According to a tenth aspect, a communication apparatus is provided. The communication apparatus includes a processor and an interface circuit. The interface circuit is configured to communicate with a module outside the communication apparatus. The processor is configured to run a computer program or instructions to perform the method in any one of the foregoing aspects. The communication apparatus may be the terminal device in the first aspect, the second aspect, or the third aspect; an apparatus including the foregoing terminal device; or an apparatus, for example, a chip, included in the foregoing terminal device.

Alternatively, the interface circuit may be a code/data read/write interface circuit. The interface circuit is configured to receive computer-executable instructions (the computer-executable instructions are stored in a memory, and may be directly read from the memory, or may be read through another component) and transmit the computer-executable instructions to the processor. The processor is configured to run the computer-executable instructions to perform the method in any one of the foregoing aspects.

In some possible designs, the communication apparatus may be a chip or a chip system.

For technical effect that can be achieved in the second aspect and the fourth aspect to the tenth aspect, refer to descriptions of technical effect that can be achieved in the first aspect or the third aspect. Details are not described herein again.

BRIEF DESCRIPTION OF DRAWINGS

FIG. 4 is a schematic diagram of a communication process according to an embodiment of this application;

FIG. 5 is a schematic diagram of a communication process according to an embodiment of this application;

DESCRIPTION OF EMBODIMENTS

Figure 1:
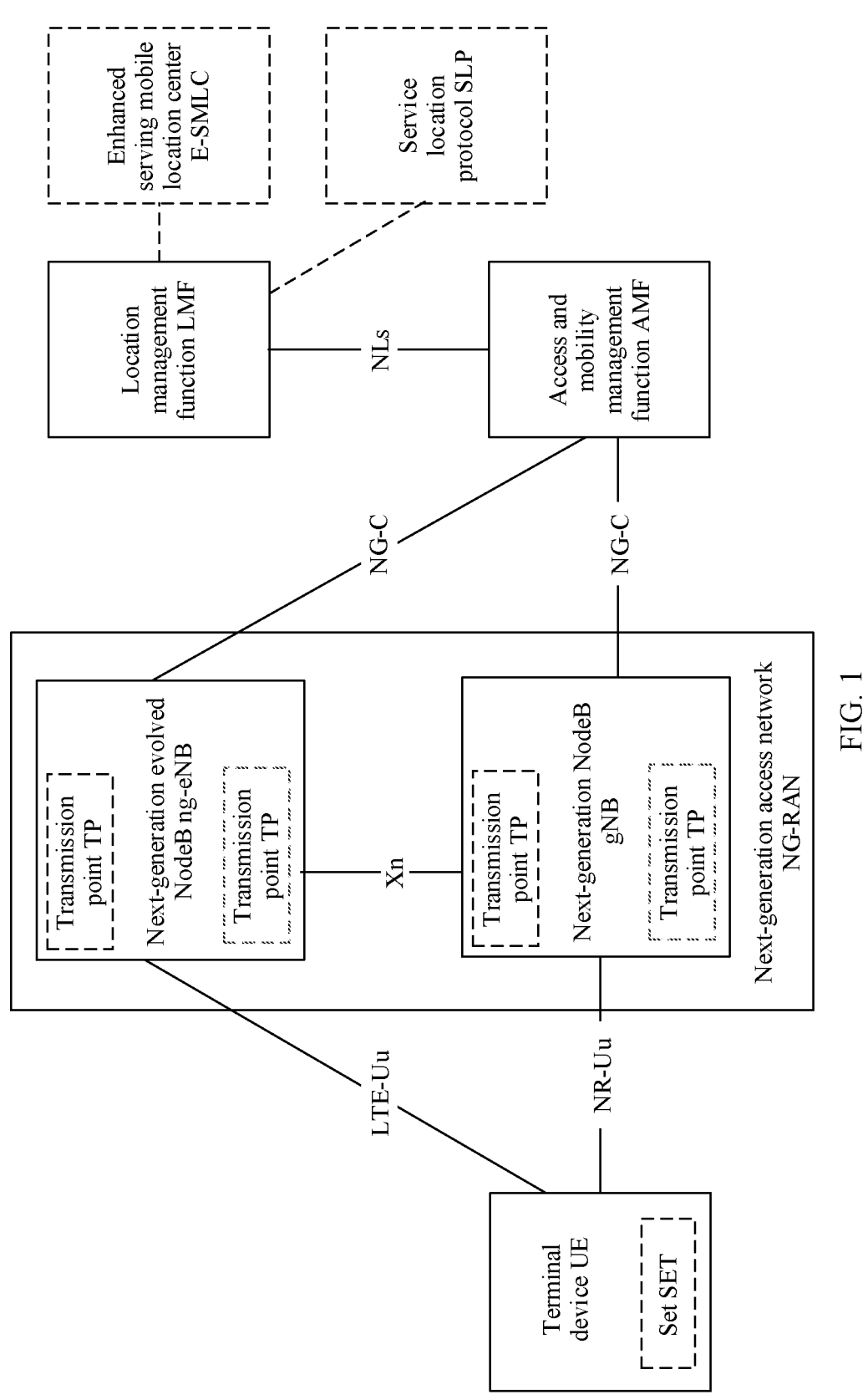
FIG. 1 is a schematic diagram of an architecture of a communication system according to an embodiment of this application.

The following further describes in detail this application with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in embodiments of this application is used to represent giving an example, an illustration, or a description. Any embodiment or design described as an "example" in this application should not be explained as being more preferred or having more advantages than another embodiment or design. Exactly, the term "example" is used to present a concept in a specific manner.

A network architecture and a service scenario that are described in embodiments of this application are intended to describe the technical solutions in embodiments of this application more clearly, and do not constitute a limitation on the technical solutions provided in embodiments of this application. Persons of ordinary skill in the art may know that, with evolution of the network architecture and emergence of new service scenarios, the technical solutions provided in embodiments of this application are also applicable to similar technical problems.

The following describes some terms in embodiments of this application, to facilitate understanding of persons skilled in the art.

(1) A terminal device, also referred to as a user terminal, is a device having a wireless transceiver function, and may communicate with one or more core network (core network, CN) devices (which may also be referred to as core devices) by using an access network device (which may also be referred to as an access device) in a radio access network (radio access network, RAN).

User equipment may also be referred to as an access terminal, a terminal, a subscriber unit, a subscriber station, a mobile station (mobile station, MS), a mobile console, a remote station, a remote terminal, a mobile device, a subscriber unit (subscriber unit), a user terminal, a user agent, a user apparatus, or the like. The user equipment may be deployed on land, where the deployment includes indoor or outdoor, or handheld or vehicle-mounted deployment, may be deployed on water (for example, on a ship), or may be deployed in air (for example, on aircraft, a balloon, or a satellite). The user equipment may be a cellular phone (cellular phone), a cordless phone, a session initiation protocol (session initiation protocol, SIP) phone, a smartphone (smartphone), a mobile phone (mobile phone), a wireless local loop (wireless local loop, WLL) station, a wireless data card, a personal digital assistant (personal digital assistant, PDA), a tablet computer, a wireless modem (modem), a handset (handset), a laptop computer (laptop computer), a machine type communication (machine type communication, MTC) terminal, or the like. Alternatively, the user equipment may be a handheld device with a wireless communication function, a computing device, another device connected to a wireless modem, a vehicle-mounted device, a wearable device, an unmanned aerial vehicle device, a terminal in the internet of things or the internet of vehicles, a terminal in any form in a 5G network and a future network, relay user equipment, a terminal in a future evolved public land mobile network (public land mobile network, PLMN), or the like. The relay user equipment may be, for example, a 5G residential gateway (residential gateway, RG). For example, the user equipment may be a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. A type or the like of the terminal device is not limited in embodiments of this application.

In a positioning scenario, a to-be-positioned target may be a terminal device. In this embodiment of this application, an example in which the to-be-positioned target is the terminal device is mainly used for description. For another to-be-positioned target, the solution provided in embodiments of this application is also applicable.

(2) A network device is a device that can provide a wireless access function for a terminal. The network device may support at least one wireless communication technology, for example, long term evolution (long term evolution, LTE), new radio (new radio, NR), or wideband code division multiple access (wideband code division multiple access, WCDMA).

For example, the network device may include an access network device. For example, the network device includes but is not limited to an evolved NodeB (evolved NodeB, eNB) and/or a next-generation base station or a next-generation NodeB (generation NodeB, gNB) in a 5G network. The eNB is an apparatus that is deployed in a radio access network, that meets a 4G standard, and that provides a wireless communication function for UE. The eNB may include a macro base station, a micro base station (also referred to as a small cell), a relay station, an access point, a wearable device, and a vehicle-mounted device in various forms. The eNB may alternatively be a transmission reception point (transmission reception point, TRP). The gNB is an apparatus that is deployed in a radio access network, that meets a 5G standard, and that provides a wireless communication function for UE. The gNB may include a macro base station, a micro base station (also referred to as a small cell), a relay station, an access point, a wearable device, and a vehicle-mounted device in various forms. The gNB may alternatively be a TRP or a transmission measurement function (transmission measurement function, TMF). The gNB may include a central unit (central unit, CU) and a distribution unit (distributed unit, DU) that are integrated into the gNB. The network device may alternatively include a radio network controller (radio network controller, RNC), a NodeB (NodeB, NB), a base station controller (base station controller, BSC), a base transceiver station (base transceiver station, BTS), a home NodeB (for example, a home evolved NodeB or a home NodeB, HNB), a baseband unit (baseband unit, BBU), a transmitting point (transmitting point, TP), a mobile switching center, a small cell, a pico cell, and the like. The network device may alternatively be a radio controller in a cloud radio access network (cloud radio access network, CRAN) scenario, or the network device may be a relay station, an access point, a vehicle-mounted device, a terminal, a wearable device, a network device in future mobile communication, a network device in a future evolved public land mobile network (public land mobile network, PLMN), or the like.

For another example, the network device may include a core network (CN) device, and the core network device includes, for example, an access and mobility management function (access and mobility management function, AMF).

In a positioning scenario, the network device may alternatively include a location management function (location management function, LMF), and the LMF may be an apparatus or a component that provides a positioning function for a terminal device. Optionally, the LMF is deployed in the core network.

In the positioning scenario, the network device may send a PRS to the terminal device. The network device may be referred to as a signal sending end, and the terminal device may be referred to as a signal receiving end. The PRS is also referred to as a measurement signal, and is a signal used to measure a location of the terminal device. The network device may be a transmission point, a base station, an LMF, or the like. The transmission point may be a transmission point (transmission point, TP) or a TRP. The transmission point may belong to a serving cell of the terminal device, belong to a non-serving cell of the terminal device, or not belong to any cell.

(3) A positioning technology is a technology of determining a location of a terminal device based on time (time differences) of arrival and/or angles of arrival at which a plurality of PRSs arrive at the terminal device. The positioning technology includes but is not limited to a downlink time difference of arrival (downlink time difference of arrival, DL-TDOA), a downlink angle of departure (downlink angle of departure, DL-AOD), an uplink time difference of arrival (uplink time difference of arrival, UL-TDOA), an uplink angle of arrival (uplink angle of arrival, UL-AOA), and multi-round trip time (multi-round trip time, multi-RTT).

The DL-TDOA positioning technology, the UL-TDOA positioning technology, and the multi-RTT positioning technology are implemented based on time of arrival. Specifically, the terminal device measures the time (differences) of arrival of the plurality of PRSs, and determines a distance (difference) between the terminal device and each transmission point, to determine the location of the terminal device. The DL-AOD positioning technology and the UL-AOA positioning technology are implemented based on an angle of arrival. Specifically, the terminal device measures the angles of arrival of the plurality of PRSs, and determines an angle between the terminal device and each transmission point, to determine the location of the terminal device.

For example, the positioning technology is applicable to a security positioning service in the industrial field.

The positioning scenario in embodiments of this application may include a positioning scenario in an indoor environment, or may include a positioning scenario in an outdoor environment (for example, an industrial park environment). This is not limited herein.

The term "and/or" in this application describes an association relationship for describing associated objects and indicates that three relationships may exist. For example, A and/or B may indicate the following three cases: Only A exists, both A and B exist, and only B exists. The character "/" usually indicates an "or" relationship between the associated objects.

"A plurality of" in this application means two or more.

In addition, it should be understood that in descriptions of this application, terms such as "first" and "second" are merely used for distinguishing and description, but should not be understood as indicating or implying relative importance, or should not be understood as indicating or implying a sequence.

The technical solutions in embodiments of this application may be applied to various communication systems (also referred to as mobile communication systems or wireless communication systems). The communication system usually includes but is not limited to a 4G network, an LTE system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5G communication system, an NR, and another future communication system such as 6G.

FIG. 1 shows a possible architecture of a communication system, which includes a terminal device (UE), an access network device (for example, a next generation (next generation, ng)-eNB and a gNB in FIG. 1), and a core network device (for example, an AMF and an LMF in FIG. 1). Optionally, the architecture of the communication system further includes an enhanced serving mobile location center (enhanced serving mobile location center, E-SMLC) and an entity that stores a service location protocol (service location protocol, SLP). Optionally, the ng-eNB may include one or more transmission points TPs, and the gNB may include one or more transmission points TPs.

For meanings of an LTE-Uu interface between the ng-eNB and the UE, an NR-Uu interface between the gNB and the UE, an NG-C interface between the ng-eNB and the AMF, an NG-C interface between the gNB and the AMF, an NLs interface between the LMF and the AMF, and an Xn interface between the ng-eNB and the gNB, refer to meanings defined in the 3GPP standard protocol. The meanings of the foregoing interfaces are not limited in this application. It should be noted that names of interfaces between network functions in FIG. 1 are merely examples. In a specific implementation, names of interfaces in the system architecture may alternatively be other names. This is not specifically limited in this embodiment of this application.

Figure 2:
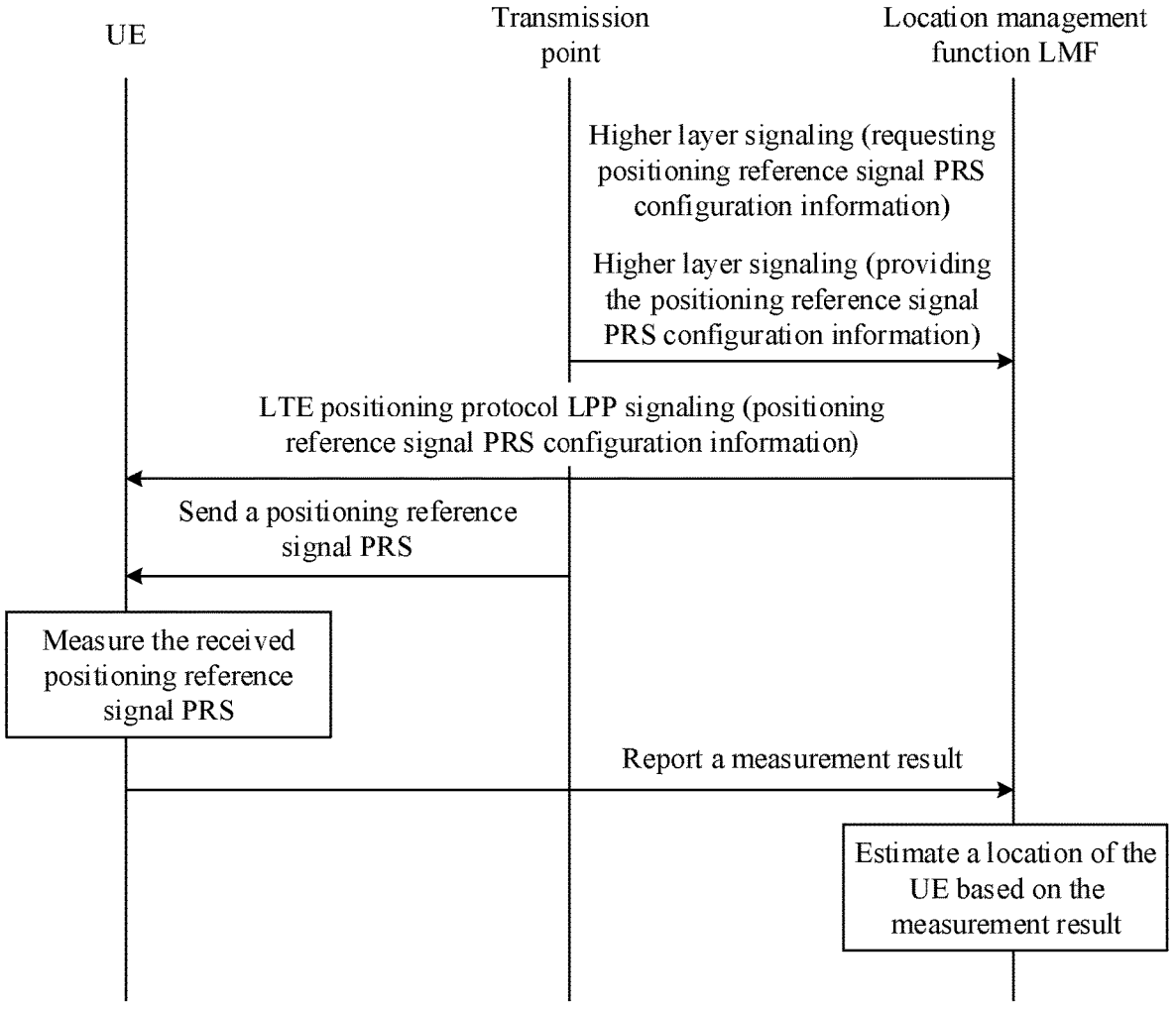
FIG. 2 is a schematic diagram of a positioning procedure.

Refer to FIG. 2, a positioning process is described. An LMF requests PRS configuration information from a transmission point (generally a plurality of transmission points) by using higher layer signaling, and the transmission point provides the PRS configuration information for the LMF by using the higher layer signaling. The LMF sends the PRS configuration information of each transmission point to UE by using an LTE positioning protocol (LTE positioning protocol, LPP) signaling. Each transmission point sends a PRS to the UE. The UE measures each received PRS based on the PRS configuration information of each transmission point. The UE reports a measurement result to the LMF, and the LMF estimates a location of the UE based on the measurement result reported by the UE.

Figure 3:
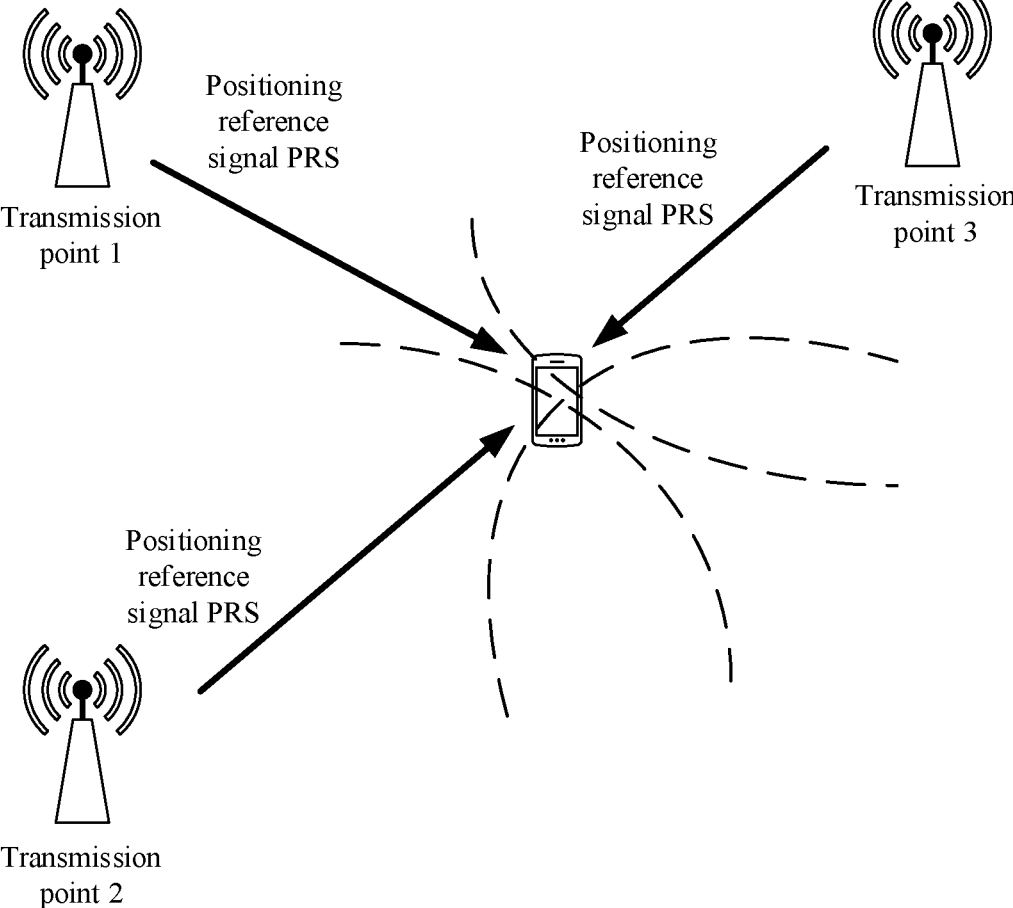
FIG. 3 is a schematic diagram of an architecture of a communication system.

With reference to FIG. 3, a process of estimating a location of UE by an LMF is described by using a DL-TDOA as an example. In FIG. 3, three transmission points are included: a transmission point 1, a transmission point 2, and a transmission point 3. It is known that coordinates of the transmission point 1 are $(x_1, y_1)$, coordinates of the transmission point 2 are $(x_2, y_2)$, and coordinates of the transmission point 3 are $(x_3, y_3)$. It is assumed that coordinates of the to-be-positioned UE are $(x_{UE}, y_{UE})$, where $x_{UE}$ and $y_{UE}$ are unknown numbers. The transmission point 1 is used as a reference transmission point, and the UE measures a time difference of arrival $\Delta t_{21}$ between a PRS of the transmission point 2 and a PRS of the transmission point 1, and a time difference of arrival $\Delta t_{31}$ between a PRS of the transmission point 3 and the PRS of the transmission point 1. Based on a definition of a hyperbola (that is, a difference between distances from two fixed points is a constant), the UE is located on a hyperbola with the transmission point 1 and the transmission point 2 as focal points, and an equation (1) is obtained; and the UE is located on a hyperbola with the transmission point 1 and the transmission point 3 as focal points, and an equation (2) is obtained.

$$\sqrt{(x_1-x_{UE})^2+(y_1-y_{UE})^2}-\sqrt{(x_2-x_{UE})^2+(y_2-y_{UE})^2}=c*\Delta t_{21} \qquad (1)$$

$$\sqrt{(x_1-x_{UE})^2+(y_1-y_{UE})^2}-\sqrt{(x_3-x_{UE})^2+(y_3-y_{UE})^2}=c*\Delta t_{31} \qquad (2)$$

c is a speed of light, and therefore there are only two unknown numbers $x_{UE}$ and $y_{UE}$ to be solved. Location coordinates of the UE may be calculated by combining the equations (1) and (2).

It can be learned that, if the UE or the LMF knows which transmission point each PRS is from, and knows coordinates of each transmission point, the UE or the LMF can calculate the location of the UE. Therefore, the PRS configuration information does not need to include additional indication information. However, whether the PRS is from a serving cell or a non-serving cell also needs to be considered in the following cases.

In a first possible case, a collision between a synchronization signal and broadcast physical channel (physical broadcast channel, PBCH) block (synchronization signal and PBCH block, SSB) and the PRS is processed.

If a base station determines that there are the SSB and the PRS to be sent on a time-frequency resource, the base station sends the SSB on the time-frequency resource, rather than the PRS.

Before receiving the PRS, the UE determines whether there is an SSB (or a time-frequency resource of the SSB) on an orthogonal frequency division multiplexing (orthogonal frequency division multiplexing, OFDM) symbol in which a PRS resource is located. If there is the SSB that is from a same serving cell as the PRS on these OFDMs, the UE does not receive the PRS from the serving cell. Alternatively, if there is the SSB that is from a same non-serving cell as the PRS on these OFDMs, the UE does not receive the PRS from the non-serving cell. This can avoid unnecessary power consumption generated by the UE, so that the UE can save more power.

For example, if a transmission point determines that, in a same serving cell, an SSB collides with a PRS, the transmission point does not send the PRS. However, for the UE, if the UE cannot correctly determine that the SSB collides with the PRS, the UE still detects the PRS, but the transmission point does not send the PRS actually, and the UE incorrectly detects the PRS (for example, measurement of time of arrival (time of arrival, TOA) is incorrect). This affects positioning accuracy and positioning performance of a downlink positioning technology.

For another example, if an SSB does not collide with a PRS actually, a transmission point delivers the PRS. However, for the UE, if the UE incorrectly considers that the SSB collides with the PRS, the UE does not detect the PRS, resulting in missing detection of the PRS. This also affects positioning accuracy and positioning performance of the downlink positioning technology.

In a second possible case, open-loop power control processing and spatial relation configuration processing are performed on a sounding reference signal (sounding reference signal, SRS).

Currently, the PRS can be configured as a pathloss reference signal of an uplink positioning SRS to implement power configuration. Specifically, the SRS may be configured with a PRS in a serving cell, or may be configured with a PRS in a non-serving cell.

In addition, currently, the PRS is used as a spatial relation reference signal of the SRS to implement beam configuration. Specifically, the SRS may be configured with the PRS in the serving cell, or may be configured with the PRS in the non-serving cell.

For example, the UE wants to send the SRS based on the PRS in the serving cell. However, due to a configuration error of the UE, the UE may send the SRS based on the PRS in the non-serving cell, resulting in a power configuration error or a beam configuration error. This affects positioning accuracy and positioning performance of an uplink positioning technology.

In conclusion, because whether the PRS is from the serving cell or the non-serving cell cannot be determined in a related technology, the collision between the SSB and the PRS cannot be accurately processed, and power and a beam of the uplink positioning SRS cannot be accurately configured, resulting in low positioning accuracy and poor positioning performance. Therefore, a technical solution is urgently required to distinguish whether the PRS is from the serving cell or the non-serving cell.

In view of this, embodiments of this application provide a communication method. In the method, when a first condition is met, a terminal device may determine, based on a physical cell identifier and/or a cell global identifier that are/is included in positioning reference signal configuration information, that a positioning reference signal corresponding to the positioning reference signal configuration information is from a serving cell; or when a second condition is met, a terminal device may determine, based on a physical cell identifier and/or a cell global identifier that are/is included in positioning reference signal configuration information, that a positioning reference signal corresponding to the positioning reference signal configuration information is from a non-serving cell. Therefore, the terminal device may determine that the positioning reference signal is from the serving cell or the non-serving cell, to accurately process a collision between the positioning reference signal and another signal, and accurately configure power and a beam of an uplink positioning signal. This improves positioning accuracy and performance.

The communication method provided in embodiments of this application may be applied to the communication system shown in FIG. 1 or FIG. 3. FIG. 4 shows a possible communication process according to an embodiment of this application. The process includes the following steps.

S401: A terminal device receives positioning reference signal configuration information.

Optionally, a location management function LMF may send positioning reference signal configuration information of each transmission point to the terminal device, and the terminal device may receive the positioning reference signal configuration information from the LMF. Alternatively, the transmission point may send the positioning reference signal configuration information of the transmission point to the terminal device, and the terminal device receives the positioning reference signal configuration information from the transmission point. The transmission point may belong to a serving cell, belong to a non-serving cell, or not belong to any cell.

The positioning reference signal configuration information includes but is not limited to one or more pieces of the following information: a transmission point identifier, a physical cell identifier, a cell global identifier, a band on which a positioning reference signal is located, a positioning reference signal resource, and the like. In a possible case, the positioning reference signal configuration information includes physical cell identifier and/or a cell global identifier. In another possible case, the positioning reference signal configuration information does not include a physical cell identifier and a cell global identifier.

In a possible example, the positioning reference signal is a PRS.

For example, the positioning reference signal configuration information is as follows:

```
NR-DL-PRS-AssistanceDataPerTRP-r16 ::= SEQUENCE {
  dl-PRS-ID-r16          INTEGER (0..255),
  nr-PhysCellID-r16      NR-PhysCellID-r16    OPTIONAL,-- Need
ON
  nr-CellGlobalID-r16    NCGI-r15             OPTIONAL,-- Need
ON
  nr-ARFCN-r16           ARFCN-ValueNR-r15    OPTIONAL,-- Need
ON
  ...
  nr-DL-PRS-Info-r16     NR-DL-PRS-Info-r16,
  ...
}
```

The dl-PRS-ID-r16 field is a transmission point identifier (or a sequence number), to be specific, indicates a transmission point from which a PRS (namely, the PRS corresponding to the positioning reference signal) is. A value range of the dl-PRS-ID-r16 field is (0, 255). The dl-PRS-ID-r16 field is mandatory.

The nr-PhysCellID-r16 field is a physical cell identifier, to be specific, indicates a physical cell identifier (PCI) of the PRS. A value range of the nr-PhysCellID-r16 field is (0, 1007). The nr-PhysCellID-r16 field is optional.

The nr-CellGlobalID-r16 field is a cell global identifier, to be specific, indicates a cell global identifier (CGI) of the PRS. The CGI is globally unique. The nr-CellGlobalID-r16 field is optional.

The nr-ARFCN-r16 field indicates a band (that is, an absolute frequency location or a frequency layer) on which the PRS is located. The nr-ARFCN-r16 field is optional.

The nr-DL-PRS-Info-r16 field indicates a PRS resource of the transmission point. For example, information about the nr-DL-PRS-Info-r16 field is as follows:

```
DL-PRS-ID-Info-r16 ::= SEQUENCE {
  dl-PRS-ID-r16                  INTEGER (0..255),
  nr-DL-PRS-ResourceID-List-r16  SEQUENCE (SIZE
(1..nrMaxResourceIDs- r16)) OF
                                 NR-DL-PRS-ResourceID-r16
  OPTIONAL,
  nr-DL-PRS-ResourceSetID-r16    NR-DL-PRS-ResourceSetID-r16
  OPTIONAL
}
```

The nr-DL-PRS-ResourceID-List-r16 field is an identifier of the PRS resource.

The nr-DL-PRS-ResourceSetID-r16 field is an identifier of a PRS resource set.

S402: When the positioning reference signal configuration information includes the physical cell identifier and/or the cell global identifier, if a first condition is met, the terminal device determines that a positioning reference signal corresponding to the positioning reference signal configuration information is from a serving cell.

Generally, after the terminal device accesses the serving cell, the terminal device may obtain information about the serving cell. For example, the information about the serving cell includes one or more of the following: a physical cell identifier of the serving cell, a global cell identifier of the serving cell, a band corresponding to the serving cell, and the like. The band corresponding to the serving cell is a location of the serving cell in a spectrum and an occupied bandwidth. Optionally, if the terminal device does not obtain the information about the serving cell after accessing the serving cell, the serving cell or the LMF may send the information about the serving cell to the terminal device.

The first condition includes: The physical cell identifier included in the positioning reference signal configuration information is the same as the physical cell identifier of the serving cell, and a band on which the positioning reference signal is located is the same as the band corresponding to the serving cell; the physical cell identifier included in the positioning reference signal configuration information is the same as the physical cell identifier of the serving cell; and/or the cell global identifier included in the positioning reference signal configuration information is the same as the cell global identifier of the serving cell. It may be understood that when there is only one serving cell, when determining that the physical cell identifier included in the positioning reference signal configuration information is the same as the physical cell identifier of the serving cell, the terminal device may determine that the positioning reference signal corresponding to the positioning reference signal is from the serving cell.

For example, when the positioning reference signal configuration information further includes the band on which the positioning reference signal is located, and the band on which the positioning reference signal is located is indicated by an absolute radio frequency channel number (absolute radio frequency channel number, ARFCN), if an ARFCN included in the positioning reference signal configuration information is the same as an ARFCN of the serving cell, the terminal device may determine that the band on which the positioning reference signal is located is the same as the band corresponding to the serving cell.

For example, the positioning reference signal configuration information includes one or more of the nr-PhysCellID-r16, the nr-CellGlobalID-r16, and the nr-ARFCN-r16. If at least one of two parameters: nr-PhysCellID-r16 and nr-CellGlobalID-r16 is provided, and one or more parameters: the nr-PhysCellID-r16, the nr-CellGlobalID-r16, and the nr-ARFCN-r16 that are associated with the dl-PRS-ID-r16 are respectively the same as one or more corresponding parameters of the physical cell identifier, the global cell identifier, and the ARFCN of the serving cell, the terminal device may determine that the positioning reference signal is from the serving cell. In this case, the first condition is met.

For example, when the positioning reference signal configuration information includes the nr-PhysCellID-r16, if the nr-PhysCellID-r16 is the same as the physical cell identifier (PCI) of the serving cell, and the band on which the positioning reference signal is located is the same as the band corresponding to the serving cell, the terminal device may determine that the positioning reference signal is from the serving cell. In this case, if the positioning reference signal configuration information does not include the nr-ARFCN-r16, the terminal device may determine, based on another field (for example, a pointA field) in the positioning reference signal configuration information, the band on which the positioning reference signal is located.

When the positioning reference signal configuration information includes the nr-CellGlobalID-r16, if the nr-CellGlobalID-r16 is the same as the cell global identifier (CGI) of the serving cell, the terminal device may determine that the positioning reference signal is from the serving cell.

When the positioning reference signal configuration information includes the nr-PhysCellID-r16 and the nr-CellGlobalID-r16, if the nr-PhysCellID-r16 is the same as the physical cell identifier of the serving cell, and the nr-CellGlobalID-r16 is the same as the cell global identifier of the serving cell, the terminal device may determine that the positioning reference signal is from the serving cell.

When the positioning reference signal configuration information includes the nr-PhysCellID-r16 and the nr-ARFCN-r16, if the nr-PhysCellID-r16 is the same as the physical cell identifier of the serving cell, and the nr-ARFCN-r16 is the same as the ARFCN of the serving cell, the terminal device may determine that the positioning reference signal is from the serving cell.

When the positioning reference signal configuration information includes the nr-CellGlobalID-r16 and the nr-ARFCN-r16, if the nr-CellGlobalID-r16 is the same as the cell global identifier of the serving cell, and the nr-ARFCN-r16 is the same as the ARFCN of the serving cell, the terminal device may determine that the positioning reference signal is from the serving cell.

When the positioning reference signal configuration information includes the nr-PhysCellID-r16, the nr-CellGlobalID-r16, and the nr-ARFCN-r16, if the nr-PhysCellID-r16 is the same as the physical cell identifier of the serving cell, the nr-CellGlobalID-r16 is the same as the cell global identifier of the serving cell, and the nr-ARFCN-r16 is the same as the ARFCN of the serving cell, the terminal device may determine that the positioning reference signal is from the serving cell.

In a possible case, the positioning reference signal corresponding to the positioning reference signal configuration information is not associated with any cell, in other words, the positioning reference signal does not belong to a serving cell or a non-serving cell. For example, when a third condition is met, the terminal device may alternatively determine that the positioning reference signal corresponding to the positioning reference signal configuration information is not associated with any cell. The third condition includes that the positioning reference signal configuration information does not include a physical cell identifier and a cell global identifier.

Optionally, when the positioning reference signal configuration information includes the physical cell identifier and/or the cell global identifier, if a second condition is met, the terminal device may determine that the positioning reference signal corresponding to the positioning reference signal configuration information is from a non-serving cell.

The second condition is that: The first condition is not met, and the third condition is not met. Regardless of whether the terminal device can obtain information about the non-serving cell, if the first condition is not met and the third condition is not met, the terminal device may determine that the physical cell identifier and/or the cell global identifier included in the positioning reference signal configuration information meet/meets the second condition. In other words, when the positioning reference signal configuration information includes the physical cell identifier and/or the cell global identifier, if the first condition is not met, the terminal device determines that the positioning reference signal corresponding to the positioning reference signal configuration information is from the non-serving cell.

In a possible manner, if determining that the physical cell identifier included in the positioning reference signal configuration information is different from the physical cell identifier of the serving cell, and/or the cell global identifier included in the positioning reference signal configuration information is different from the cell global identifier of the serving cell, the terminal device may determine, based on the physical cell identifier and/or the cell global identifier included in the positioning reference signal configuration information, that the positioning reference signal is from the non-serving cell.

If the terminal device obtains the information about the non-serving cell, the second condition may specifically include: The physical cell identifier included in the positioning reference signal configuration information is the same as a physical cell identifier of the non-serving cell, and the band on which the positioning reference signal is located is the same as a band corresponding to the non-serving cell; and/or the cell global identifier included in the positioning reference signal configuration information is the same as a cell global identifier of the non-serving cell.

It may be understood that before receiving a positioning reference signal, the terminal device receives positioning reference signal configuration information corresponding to the positioning reference signal. In other words, in S401 and S402, the terminal device has not received the positioning reference signal corresponding to the positioning reference signal configuration information. The "positioning reference signal" herein may be understood as a positioning reference signal resource, a positioning reference signal sequence, or the like.

According to the communication method provided in this embodiment of this application, the terminal device may determine, based on the physical cell identifier and/or the cell global identifier included in the positioning reference signal configuration information, that the positioning reference signal corresponding to the positioning reference signal configuration information is from the serving cell or the non-serving cell, to accurately process a collision between the positioning reference signal and another signal, and accurately configure power and a beam of an uplink positioning signal. This improves positioning accuracy and positioning performance.

This embodiment of this application may further provide another technical solution to determine that the positioning reference signal is from the serving cell or the non-serving cell. For example, the terminal device receives the positioning reference signal configuration information from the network device. The positioning reference signal configuration information indicates that the positioning reference signal corresponding to the positioning reference signal configuration information is from the serving cell, or indicates that the positioning reference signal corresponding to the positioning reference signal configuration information is from the non-serving cell.

The network device may be a transmission point, a base station, or an LMF. If the network device is an LMF, the network device may determine a serving cell of the terminal, to perform a corresponding indication in the positioning reference signal configuration information. For example, the network device may interact with the terminal device, to determine related information of the serving cell of the terminal device, and perform a corresponding indication in the positioning reference signal configuration information when the positioning reference signal corresponding to the positioning reference signal configuration information is from the serving cell of the terminal device. For another example, the network device may interact with a cell, to determine information about a terminal device (including information about the terminal device) that uses the cell as a serving cell, and perform a corresponding indication in positioning reference signal configuration information when the positioning reference signal configuration information corresponding to the cell (namely, positioning reference signal configuration information corresponding to a to-be-sent positioning reference signal in the cell) is sent to the terminal device.

Optionally, the positioning reference signal configuration information includes first indication information. The first indication information indicates that the positioning reference signal corresponding to the positioning reference signal configuration information is from the serving cell, or indicates that the positioning reference signal corresponding to the positioning reference signal configuration information is from the non-serving cell.

In the method, the terminal device may directly determine, based on an indication of the positioning reference signal configuration information, that the positioning reference signal corresponding to the positioning reference signal configuration information is from the serving cell or the non-serving cell, to accurately process a collision between the positioning reference signal and another signal, and accurately configure power and a beam of an uplink positioning signal. This improves positioning accuracy and positioning performance.

According to descriptions of the related technology, an embodiment of this application may further provide a technical solution to distinguish whether the PRS and another signal are from the same serving cell or the same non-serving cell, to further improve positioning accuracy and positioning performance.

FIG. 5 shows a possible communication process according to an embodiment of this application. The process includes the following steps.

S501: A terminal device receives positioning reference signal configuration information.

For an implementation process of S501, refer to S401. Details are not described herein again.

S502: The terminal device receives first signal configuration information.

A sequence of S501 and S502 is not limited.

Optionally, the terminal device receives first signal configuration information from a transmission point.

The first signal configuration information includes but is not limited to one or more pieces of the following information: a physical cell identifier (PCI), a cell global identifier (CGI), a band (such as an ARFCN) on which a positioning reference signal is located, and the like.

A first signal corresponding to the first signal configuration information may be a synchronization signal block, or may be a downlink signal such as a channel state information reference signal (channel state information reference signal, CSI-RS) or a demodulation reference signal (demodulation reference signal, DMRS). For example, the synchronization signal block may be an SSB.

S503: When the positioning reference signal configuration information includes a physical cell identifier and/or a cell global identifier, if a fourth condition is met, the terminal device determines that a positioning reference signal corresponding to the positioning reference signal configuration information and the first signal corresponding to the first signal configuration information are from a same serving cell.

Optionally, when the positioning reference signal configuration information includes a physical cell identifier and/or a cell global identifier, if a fifth condition is met, the terminal device may alternatively determine that a positioning reference signal corresponding to the positioning reference signal configuration information and the first signal corresponding to the first signal configuration information are from a same non-serving cell.

When the positioning reference signal is from a serving cell and the first signal is from a serving cell, the terminal device may determine that the positioning reference signal and the first signal are from the same serving cell. The fourth condition may include: The physical cell identifier corresponding to the positioning reference signal is the same as the physical cell identifier corresponding to the first signal. If carrier aggregation is considered, there may be a plurality of serving cells. To further improve accuracy of determining that the positioning reference signal and the first signal are from the same serving cell, the fourth condition may include: The positioning reference signal is from the serving cell, and a band on which the positioning reference signal is located is the same as a band on which the first signal is located. Alternatively, the fourth condition may include: The positioning reference signal is from the serving cell, the physical cell identifier corresponding to the positioning reference signal is the same as the physical cell identifier corresponding to the first signal, and a band on which the positioning reference signal is located is the same as a band on which the first signal is located. In this case, the terminal device determines that the positioning reference signal and the first signal are from the same serving cell. When the terminal device receives a plurality of positioning reference signals, a positioning reference signal other than the positioning reference signal (namely, the positioning reference signal from the same serving cell as the first signal) may still coexist with the first signal, and may still be received by the terminal device, to further accurately process a collision between the positioning reference signal and another signal. Optionally, the fourth condition may further include: The first signal is from the serving cell. In other words, the terminal device may further determine, based on one or more pieces of information included in the first signal configuration information, that the first signal is from the serving cell.

Optionally, when the band on which the positioning reference signal is located is the same as the band on which the first signal is located, it may be considered that the positioning reference signal and the first signal are from a same cell. If the positioning reference signal is from the serving cell, the first signal is from the same serving cell as the positioning reference signal, that is, the positioning reference signal and the first signal are from the same serving cell. If the positioning reference signal is from the non-serving cell, the first signal is from the same non-serving cell as the positioning reference signal, that is, the positioning reference signal and the first signal are from the same non-serving cell.

The fifth condition may include: The positioning reference signal is from the non-serving cell, and a physical cell identifier corresponding to the positioning reference signal is the same as a physical cell identifier corresponding to the first signal.

Alternatively, the fifth condition may include: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located.

Optionally, the fifth condition may further include: The first signal is from the non-serving cell. In other words, the terminal device may further determine, based on one or more pieces of information included in the first signal configuration information, that the first signal is from the non-serving cell.

For example, whether the positioning reference signal and the first signal are from a same cell is described by using an example in which the positioning reference signal configuration information includes one or more of nr-PhysCellID-r16, nr-CellGlobalID-r16, and nr-ARFCN-r16.

When the positioning reference signal configuration information includes nr-PhysCellID-r16, and the first signal configuration information includes the physical cell identifier, if the nr-PhysCellID-r16 is the same as a physical cell identifier (PCI) corresponding to the first signal, and the band on which the positioning reference signal is located is the same as the band on which the first signal is located, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

When the positioning reference signal configuration information includes the nr-CellGlobalID-r16, and the first signal configuration information includes the cell global identifier, if the nr-CellGlobalID-r16 is the same as a cell global identifier (CGI) corresponding to the first signal, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

When the positioning reference signal configuration information includes the nr-PhysCellID-r16 and the nr-CellGlobalID-r16, and the first signal configuration information includes the physical cell identifier and the cell global identifier, if the nr-PhysCellID-r16 is the same as a physical cell identifier corresponding to the first signal, and the nr-CellGlobalID-r16 is the same as a cell global identifier corresponding to the first signal, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

When the positioning reference signal configuration information includes the nr-PhysCellID-r16 and the nr-ARFCN-r16, and the first signal configuration information includes the physical cell identifier and the ARFCN, if the nr-PhysCellID-r16 is the same as a physical cell identifier corresponding to the first signal, and the nr-ARFCN-r16 is the same as an ARFCN corresponding to the first signal, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

When the positioning reference signal configuration information includes the nr-CellGlobalID-r16 and the nr-ARFCN-r16, and the first signal configuration information includes the cell global identifier and the ARFCN, if the nr-CellGlobalID-r16 is the same as a cell global identifier corresponding to the first signal, and the nr-ARFCN-r16 is the same as an ARFCN corresponding to the first signal, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

When the positioning reference signal configuration information includes the nr-PhysCellID-r16, the nr-CellGlobalID-r16, and the nr-ARFCN-r16, and the first signal configuration information includes the physical cell identifier, the cell global identifier, and the ARFCN, if the nr-PhysCellID-r16 is the same as a physical cell identifier corresponding to the first signal, the nr-CellGlobalID-r16 is the same as a cell global identifier corresponding to the first signal, and the nr-ARFCN-r16 is the same as an ARFCN corresponding to the first signal, the terminal device may determine that the positioning reference signal and the first signal are from a same cell. In this case, if the positioning reference signal is from a serving cell, the fourth condition is met, and the positioning reference signal and the first signal are from the same serving cell; or if the positioning reference signal is from a non-serving cell, the fifth condition is met, and the positioning reference signal and the first signal are from the same non-serving cell.

In addition to the foregoing case, the positioning reference signal and the first signal are from different cells, to be specific, from different serving cells or different non-serving cells.

Optionally, if the positioning reference signal and the first signal are from a same serving cell or a same non-serving cell, the terminal device may not receive the positioning reference signal, and the positioning reference signal that is not received does not participate in positioning measurement.

According to the communication method provided in this embodiment of this application, the terminal device may determine that the positioning reference signal and the first signal are from the same serving cell or the same non-serving cell, to accurately process a collision between the positioning reference signal and another signal. This further improves positioning accuracy and positioning performance.

Figure 6:
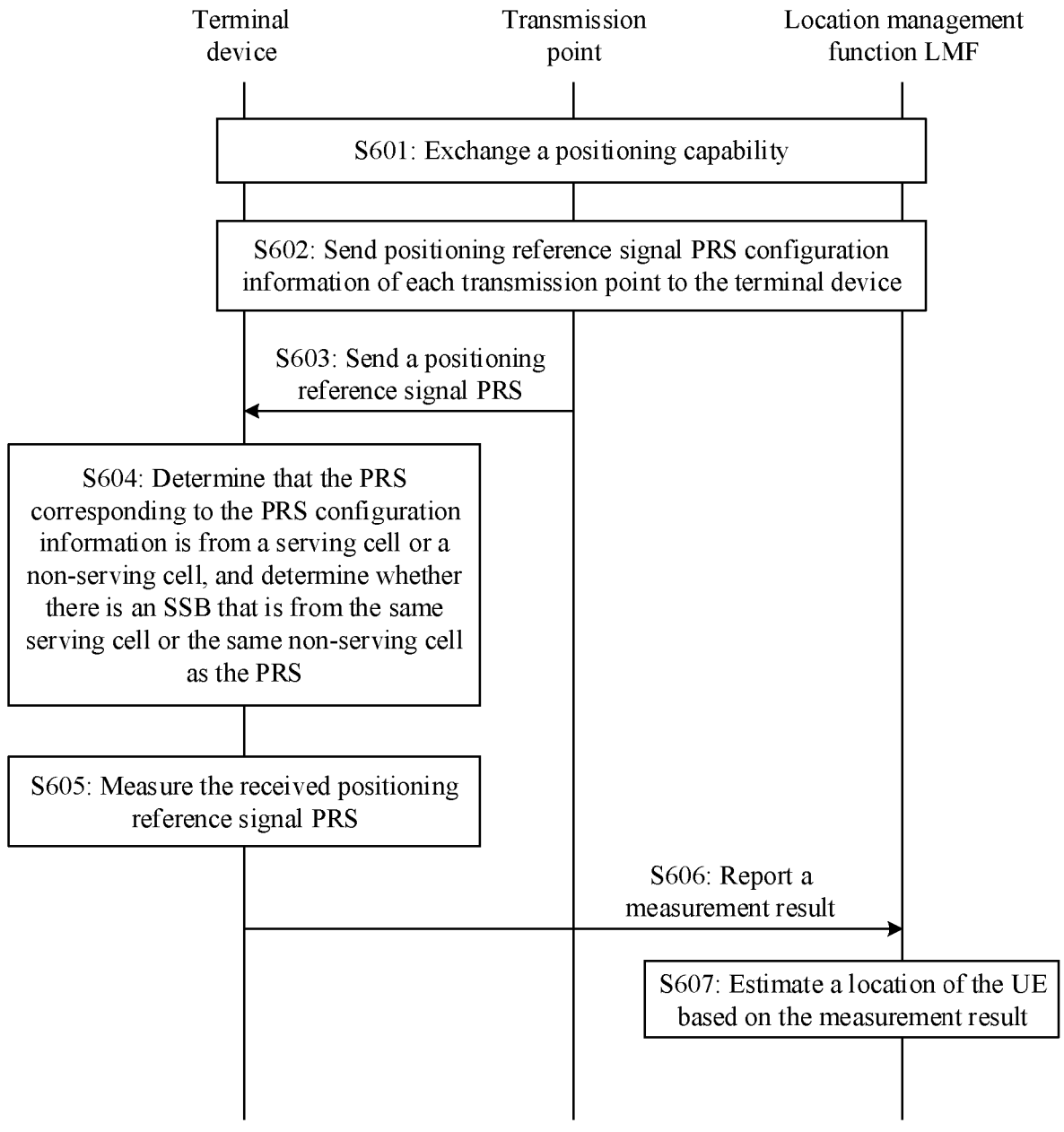
FIG. 6 is a schematic diagram of a positioning process according to an embodiment of this application.

Based on the communication processes shown in FIG. 4 and FIG. 5, a positioning technology is described with reference to FIG. 6, and includes the following steps.

S601: An LMF exchanges a positioning capability with a terminal device.

The positioning capability includes a PRS processing capability. The PRS processing capability indicates a number of PRSs processed by the terminal device within a period of time.

S602: The LMF or a transmission point sends PRS configuration information of each transmission point to the terminal device.

Each transmission point is a transmission point participating in positioning.

S603: The transmission point participating in positioning sends a PRS to the terminal device.

S604: After receiving the PRS configuration information, the terminal device determines that a PRS corresponding to the PRS configuration information is from a serving cell or a non-serving cell, and determines whether there is an SSB that is from the same serving cell or the same non-serving cell as the PRS.

For an implementation process of S604, refer to FIG. 4 and FIG. 5.

If the SSB and the PRS are from the same serving cell or the same non-serving cell, the terminal device does not receive the PRS, that is, the terminal device does not receive the PRS on a PRS resource, or the terminal device skips the PRS resource.

S605: The terminal device measures the received PRS.

S606: The terminal device reports a measurement result to the LMF.

S607: The LMF estimates a location of the terminal device based on measurement reception reported by the terminal device.

Optionally, the terminal device measures the received PRS, to estimate the location of the terminal device.

It can be learned from the foregoing embodiments that the terminal device may accurately determine that the positioning reference signal is from the serving cell or the non-serving cell, and that the positioning reference signal and the first signal are from the same serving cell or the same non-serving cell.

In this way, the positioning reference signal from the same serving cell or the same non-serving cell as the first signal is not detected, to avoid a collision between the positioning reference signal from the same serving cell or the same non-serving cell and the first signal. In addition, another positioning reference signal from a different serving cell and/or a different non-serving cell from the first signal can be accurately received, to avoid incorrect detection of the positioning reference signal and missing detection of the positioning reference signal. This ensures positioning accuracy and positioning performance of a downlink positioning technology.

In addition, the terminal device may accurately configure a positioning reference signal resource for an uplink positioning reference signal, to implement open-loop power control and beamforming, and accurately send the uplink positioning reference signal. This ensures and improves positioning accuracy and positioning performance of an uplink positioning technology. Especially for an FR2 band, effect of improving the positioning accuracy and positioning performance of the uplink positioning technology is more significant.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

Figure 7:
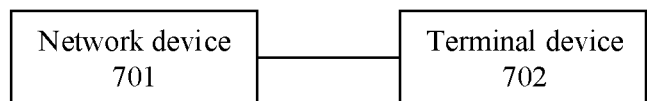
FIG. 7 is a schematic diagram of an architecture of a communication system according to an embodiment of this application.

Based on a same technical concept as the foregoing communication method, an embodiment of this application further provides a communication system. As shown FIG. 7, the communication system 700 includes a network device 701 and a terminal device 702. The network device 701 and the terminal device 702 may implement the method described in the foregoing method embodiment.

For example, the network device 701 is configured to send positioning reference signal configuration information.

The terminal device 702 is configured to: receive the positioning reference signal configuration information; and when the positioning reference signal configuration information includes a physical cell identifier and/or a cell global identifier, if a first condition is met, determine that a positioning reference signal corresponding to the positioning reference signal configuration information is from a serving cell.

In an implementation, when the positioning reference signal configuration information includes the physical cell identifier and/or the cell global identifier, if a second condition is met, a positioning reference signal corresponding to the positioning reference signal configuration information is from a non-serving cell.

In an implementation, the terminal device 702 is further configured to: when a third condition is met, determine that a positioning reference signal corresponding to the positioning reference signal configuration information is not associated with any cell. The third condition includes that the positioning reference signal configuration information does not include a physical cell identifier and a cell global identifier.

In an implementation, the first condition includes: The physical cell identifier is the same as a physical cell identifier of the serving cell, and a band on the positioning reference signal is located is the same as a band corresponding to the serving cell; the physical cell identifier is the same as the physical cell identifier of the serving cell; and/or the cell global identifier is the same as a cell global identifier of the serving cell.

In an implementation, the terminal device 702 is further configured to: when the positioning reference signal configuration information further includes an absolute radio frequency channel number ARFCN, if the ARFCN included in the positioning reference signal configuration information is the same as an ARFCN of the serving cell, determine that a band on which the positioning reference signal is located is the same as a band corresponding to the serving cell.

In an implementation, the second condition is that: The first condition is not met, and the third condition is not met.

In an implementation, the network device 701 is further configured to send first signal configuration information. The first signal configuration information includes a physical cell identifier.

The terminal device 702 is further configured to: receive the first signal configuration information; and when a fourth condition is met, determine, based on the physical cell identifier included in the first signal configuration information, that the positioning reference signal corresponding to the positioning reference signal configuration information and a first signal corresponding to the first signal configuration information are from the same serving cell; or when a fifth condition is met, determine, based on the physical cell identifier included in the first signal configuration information, that the positioning reference signal corresponding to the positioning reference signal configuration information and a first signal corresponding to the first signal configuration information are from the same non-serving cell.

In an implementation, the first signal is a synchronization signal block.

In an implementation, the fourth condition includes: The positioning reference signal is from the serving cell, and a band on which the positioning reference signal is located is the same as a band on which the first signal is located. Optionally, the fourth condition further includes that the first signal is from the serving cell.

In an implementation, in a possible implementation, the fourth condition includes: The positioning reference signal is from the serving cell, and a physical cell identifier corresponding to the positioning reference signal is the same as a physical cell identifier corresponding to the first signal.

In an implementation, the fourth condition includes: The positioning reference signal is from the serving cell, a physical cell identifier corresponding to the positioning reference signal is the same as a physical cell identifier corresponding to the first signal, and a band on which the positioning reference signal is located is the same as a band on which the first signal is located.

In an implementation, the fifth condition includes: The positioning reference signal is from the non-serving cell, and a physical cell identifier corresponding to the positioning reference signal is the same as a physical cell identifier corresponding to the first signal. Optionally, the fifth condition further includes that the first signal is from the non-serving cell.

In an implementation, the fifth condition includes: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located. Optionally, the fifth condition further includes that the first signal is from the non-serving cell.

For another example, the network device 701 is configured to send positioning reference signal configuration information. The positioning reference signal configuration information indicates that a positioning reference signal corresponding to the positioning reference signal configuration information is from a serving cell, or indicates that a positioning reference signal corresponding to the positioning reference signal configuration information is from a non-serving cell.

The terminal device 702 is configured to receive the positioning reference signal configuration information.

In an implementation, the positioning reference signal configuration information includes first indication information. The first indication information indicates that the positioning reference signal corresponding to the positioning reference signal configuration information is from the serving cell, or indicates that the positioning reference signal corresponding to the positioning reference signal configuration information is from the non-serving cell.

Figure 8:
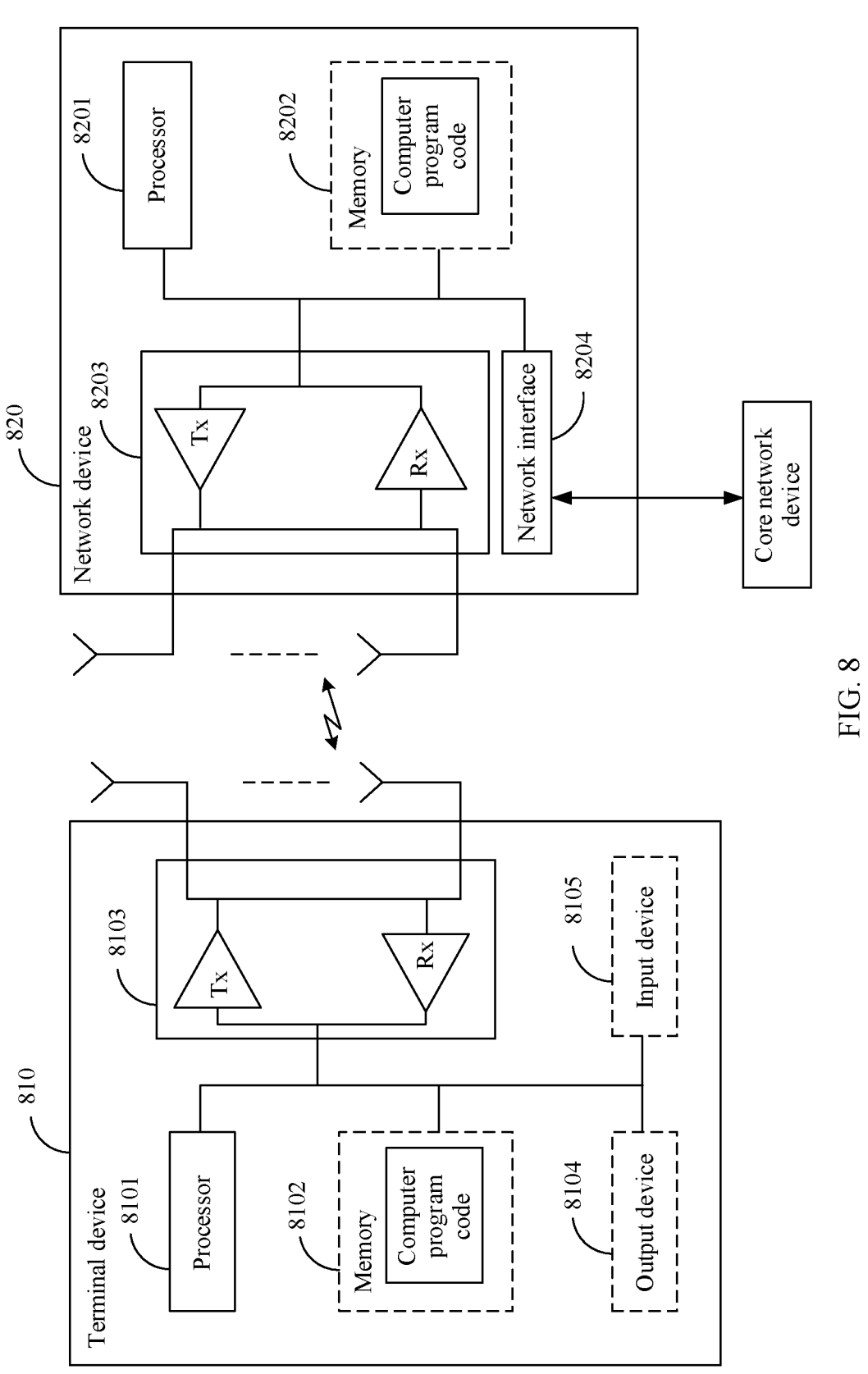
FIG. 8 is a schematic diagram of an architecture of a communication system according to an embodiment of this application.

Optionally, FIG. 8 is a schematic diagram of structures of a network device 810 and a terminal device 820 according to an embodiment of this application. The terminal device 820 includes a first terminal device and/or at least one second terminal device. A schematic diagram of a structure between the first terminal device and the at least one second terminal device is not shown in FIG. 8. The network device 810 may be an access network device, for example, a base station or a transmission point.

The terminal device 810 includes at least one processor (an example in which one processor 8101 is included is used for description in FIG. 8) and at least one transceiver (an example in which one transceiver 8103 is included is used for description in FIG. 8). Optionally, the terminal device 810 may further include at least one memory (an example in which one memory 8102 is included is used for description in FIG. 8), at least one output device (an example in which one output device 8104 is included is used for description in FIG. 8), and at least one input device (an example in which one input device 8105 is included is used for description in FIG. 8).

The processor 8101, the memory 8102, and the transceiver 8103 are connected through a communication line. The communication line may include a path for transmitting information between the foregoing components.

The processor 8101 may be a general-purpose central processing unit (central processing unit, CPU), a microprocessor, an application-specific integrated circuit (application-specific integrated circuit, ASIC), or one or more integrated circuits for controlling program execution of the solutions of this application.

The memory 8102 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be accessed by a computer and that can be configured to carry or store expected program code in an instruction form or in a data structure form, but is not limited thereto. The memory may exist independently, or may be connected to the processor through the communication line. The memory may alternatively be integrated with the processor.

The memory 8102 is configured to store computer-executable instructions for performing the solutions of this application, and the processor 8101 controls execution. The processor 8101 is configured to execute the computer-executable instructions stored in the memory 8102, to implement the communication method provided in the foregoing embodiments of this application.

Optionally, the computer-executable instructions in this embodiment of this application may also be referred to as application program code or computer program code. This is not specifically limited in this embodiment of this application.

The output device 8104 communicates with the processor 8101, and may display information in a plurality of manners. For example, the output device 8104 may be a liquid crystal display (liquid crystal display, LCD), a light emitting diode (light emitting diode, LED) display device, a cathode ray tube (cathode ray tube, CRT) display device, a projector (projector), or the like. The input device 8105 communicates with the processor 8101, and may receive an input of a user in a plurality of manners. For example, the input device 8105 may be a mouse, a keyboard, a touchscreen device, or a sensor device.

The transceiver 8103 may use any apparatus such as a transceiver, and is configured to communicate with another device or a communication network such as the ethernet, a radio access network (radio access network, RAN), or a wireless local area network (wireless local area network, WLAN). The transceiver 8103 includes a transmitter (transmitter, Tx) and a receiver (receiver, Rx).

The memory 8102 may exist independently, or may be connected to the processor 8101 through the communication line. The memory 8102 may alternatively be integrated with the processor 8101.

The memory 8102 is configured to store computer-executable instructions for performing the solutions of this application, and the processor 8101 controls execution. Specifically, the processor 8101 is configured to execute the computer-executable instructions stored in the memory 8102, to implement the communication method in embodiments of this application.

Alternatively, optionally, in this embodiment of this application, the processor 8101 may perform processing-related functions in the signal generation method provided in the following embodiments of this application, and the transceiver 8103 is responsible for communication with another device or a communication network. This is not specifically limited in this embodiment of this application.

The network device 820 includes at least one processor (an example in which one processor 8201 is included is used for description in FIG. 8), at least one transceiver (an example in which one transceiver 8203 is included is used for description in FIG. 8), and at least one network interface (an example in which one network interface 8204 is included is used for description in FIG. 8). Optionally, the network device 820 may further include at least one memory (an example in which one memory 8202 is included is used for description in FIG. 8). The processor 8201, the memory 8202, the transceiver 8203, and the network interface 8204 are connected through the communication line. The network interface 8204 is configured to connect to a core network device through a link (for example, an S1 interface), or connect to a network interface of another network device through a wired or wireless link (for example, an X2 interface) (not shown in FIG. 8). This is not specifically limited in this embodiment of this application. In addition, for related descriptions of the processor 8201, the memory 8202, and the transceiver 8203, refer to the descriptions of the processor 8101, the memory 8102, and the transceiver 8103 in the terminal device 810. Details are not described herein again.

It may be understood that the structure shown in FIG. 8 does not constitute a specific limitation on the terminal device 810 or the network device 820. For example, in some other embodiments of this application, the terminal device 810 or the network device 820 may include more or fewer components than those shown in the figure, or some components may be combined, some components may be split, or the components may be differently arranged. The components shown in the figure may be implemented by hardware, software, or a combination of software and hardware.

Figure 9:
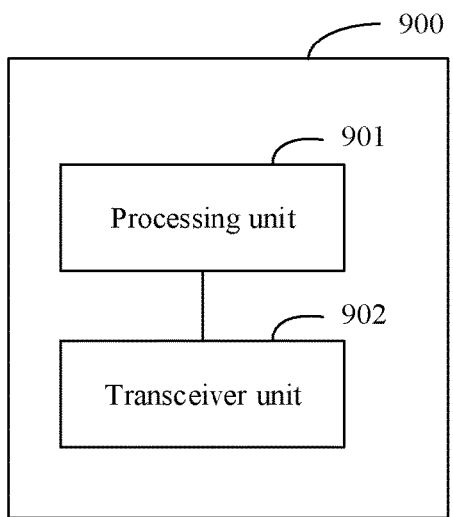
FIG. 9 is a schematic diagram of an architecture of a communication apparatus according to an embodiment of this application.

Based on a same technical concept as the foregoing communication method, an embodiment of this application further provides a communication apparatus. As shown in FIG. 9, the communication apparatus 900 includes a processing unit 901 and a transceiver unit 902. The communication apparatus 900 may be configured to implement the method described in the foregoing method embodiment.

In an embodiment, the apparatus 900 is used in a terminal device.

Specifically, the transceiver unit 902 is configured to receive positioning reference signal configuration information.

The processing unit 901 is configured to: when the positioning reference signal configuration information includes a physical cell identifier and/or a cell global identifier, if a first condition is met, determine that a positioning reference signal corresponding to the positioning reference signal configuration information is from a serving cell.

Whether the first condition is met may be determined by the processing unit 901, that is, the processing unit 901 may determine that the first condition is met, and/or determine that the first condition is not met. Correspondingly, other conditions in this embodiment of this application, for example, a second condition, a third condition, a fourth condition, and a fifth condition, may also be obtained by the processing unit 901 through determining.

In an implementation, the processing unit 901 is further configured to: when the positioning reference signal configuration information includes the physical cell identifier and/or the cell global identifier, if the second condition is met, determine that a positioning reference signal corresponding to the positioning reference signal configuration information is from a non-serving cell.

In an implementation, the processing unit 901 is further configured to: when the third condition is met, determine that a positioning reference signal corresponding to the positioning reference signal configuration information is not associated with any cell. The third condition includes that the positioning reference signal configuration information does not include a physical cell identifier and a cell global identifier.

In an implementation, the first condition includes: The physical cell identifier is the same as a physical cell identifier of the serving cell, and a band on which the positioning reference signal is located is the same as a band corresponding to the serving cell; the physical cell identifier is the same as the physical cell identifier of the serving cell; and/or the cell global identifier is the same as a cell global identifier of the serving cell.

For example, when determining whether the first condition is met, the processing unit 901 may determine, when determining that the physical cell identifier in the positioning reference signal configuration information is the same as the physical cell identifier of the serving cell, and the band on which the positioning reference signal corresponding to the positioning reference signal configuration information is located is the same as the band corresponding to the serving cell, that the first condition is met.

In an implementation, the first condition includes: When the positioning reference signal configuration information includes the physical cell identifier, the physical cell identifier is the same as a physical cell identifier of the serving cell; when the positioning reference signal configuration information includes the cell global identifier, the cell global identifier is the same as a cell global identifier of the serving cell; when the positioning reference signal configuration information includes the physical cell identifier and the cell global identifier, the physical cell identifier is the same as a physical cell identifier of the serving cell, and the cell global identifier is the same as a cell global identifier of the serving cell; when the positioning reference signal configuration information includes the physical cell identifier and an absolute radio frequency channel number, the physical cell identifier is the same as a physical cell identifier of the serving cell, and the absolute radio frequency channel number is the same as an absolute radio frequency channel number of the serving cell; when the positioning reference signal configuration information includes the cell global identifier and an absolute radio frequency channel number, the cell global identifier is the same as a cell global identifier of the serving cell, and the absolute radio frequency channel number is the same as an absolute radio frequency channel number of the serving cell; or when the positioning reference signal configuration information includes the physical cell identifier, the cell global identifier, and an absolute radio frequency channel number, the physical cell identifier is the same as a physical cell identifier of the serving cell, the cell global identifier is the same as a cell global identifier of the serving cell, and the absolute radio frequency channel number is the same as an absolute radio frequency channel number of the serving cell.

In an implementation, the processing unit 901 is further configured to: when the positioning reference signal configuration information further includes the absolute radio frequency channel number ARFCN, if the ARFCN included in the positioning reference signal configuration information is the same as the ARFCN of the serving cell, determine that the band on which the positioning reference signal is located is the same as the band corresponding to the serving cell.

In an implementation, the second condition is that: The first condition is not met, and the third condition is not met.

In an implementation, the processing unit 901 is further configured to: when the positioning reference signal configuration information includes the physical cell identifier and/or the cell global identifier, if the first condition is not met, determine that a positioning reference signal corresponding to the positioning reference signal configuration information is from a non-serving cell.

In an implementation, the transceiver unit 902 is further configured to receive first signal configuration information. The first signal configuration information includes a physical cell identifier.

The processing unit 901 is further configured to: when the fourth condition is met, determine, based on the physical cell identifier included in the first signal configuration information, that the positioning reference signal corresponding to the positioning reference signal configuration information and a first signal corresponding to the first signal configuration information are from the same serving cell; or when the fifth condition is met, determine, based on the physical cell identifier included in the first signal configuration information, that the positioning reference signal corresponding to the positioning reference signal configuration information and a first signal corresponding to the first signal configuration information are from the same non-serving cell.

In an implementation, the first signal is a synchronization signal block.

In an implementation, the fourth condition includes: The positioning reference signal is from the serving cell, and a band on which the positioning reference signal is located is the same as a band on which the first signal is located. Optionally, the fourth condition further includes that the first signal is from the serving cell.

In an implementation, in a possible implementation, the fourth condition includes: The positioning reference signal is from the serving cell, and a physical cell identifier corresponding to the positioning reference signal is the same as a physical cell identifier corresponding to the first signal.

In other words, the transceiver unit 902 is further configured to receive first signal configuration information. The first signal configuration information includes a physical cell identifier.

The processing unit 901 is further configured to: if the positioning reference signal corresponding to the positioning reference signal configuration information is from the serving cell, and the physical cell identifier corresponding to the positioning reference signal is the same as the physical cell identifier included in the first signal configuration information, determine that the positioning reference signal and the first signal corresponding to the first signal configuration information are from the same serving cell.

In an implementation, the fourth condition includes: The positioning reference signal is from the serving cell, a physical cell identifier corresponding to the positioning reference signal is the same as a physical cell identifier corresponding to the first signal, and a band on which the positioning reference signal is located is the same as a band on which the first signal is located.

In other words, the transceiver unit 902 is further configured to receive first signal configuration information. The first signal configuration information includes a physical cell identifier.

The processing unit 901 is further configured to: if the positioning reference signal corresponding to the positioning reference signal configuration information is from the serving cell, the physical cell identifier corresponding to the positioning reference signal is the same as the physical cell identifier included in the first signal configuration information, and a band on which the positioning reference signal is located is the same as a band on which the first signal corresponding to the first signal configuration information is located, determine that the positioning reference signal and the first signal are from the same serving cell.

In an implementation, the fifth condition includes: The positioning reference signal is from the non-serving cell, and a physical cell identifier corresponding to the positioning reference signal is the same as a physical cell identifier corresponding to the first signal. Optionally, the fifth signal further includes that the first signal is from the non-serving cell.

In an implementation, the fifth condition includes: The positioning reference signal is from the non-serving cell, a physical cell identifier corresponding to the positioning reference signal is the same as a physical cell identifier corresponding to the first signal, and a band on which the positioning reference signal is located is the same as a band on which the first signal is located. Optionally, the fifth signal further includes that the first signal is from the non-serving cell.

In other words, the transceiver unit 902 is further configured to receive first signal configuration information. The first signal configuration information includes a physical cell identifier.

The processing unit 901 is further configured to: if the positioning reference signal is from the non-serving cell, the physical cell identifier included in the positioning reference signal configuration information is the same as the physical cell identifier included in the first signal configuration information, and the band on which the positioning reference signal is located is the same as the band on which the first signal corresponding to the first signal configuration information is located, determine that the positioning reference signal and the first signal are from the same non-serving cell.

It should be noted that in embodiments of this application, division into modules is an example, and is merely logical function division. During actual implementation, there may be another division manner. In addition, functional units in embodiments of this application may be integrated into one processing unit, or each of the functional units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or a compact disc.

Figure 10:
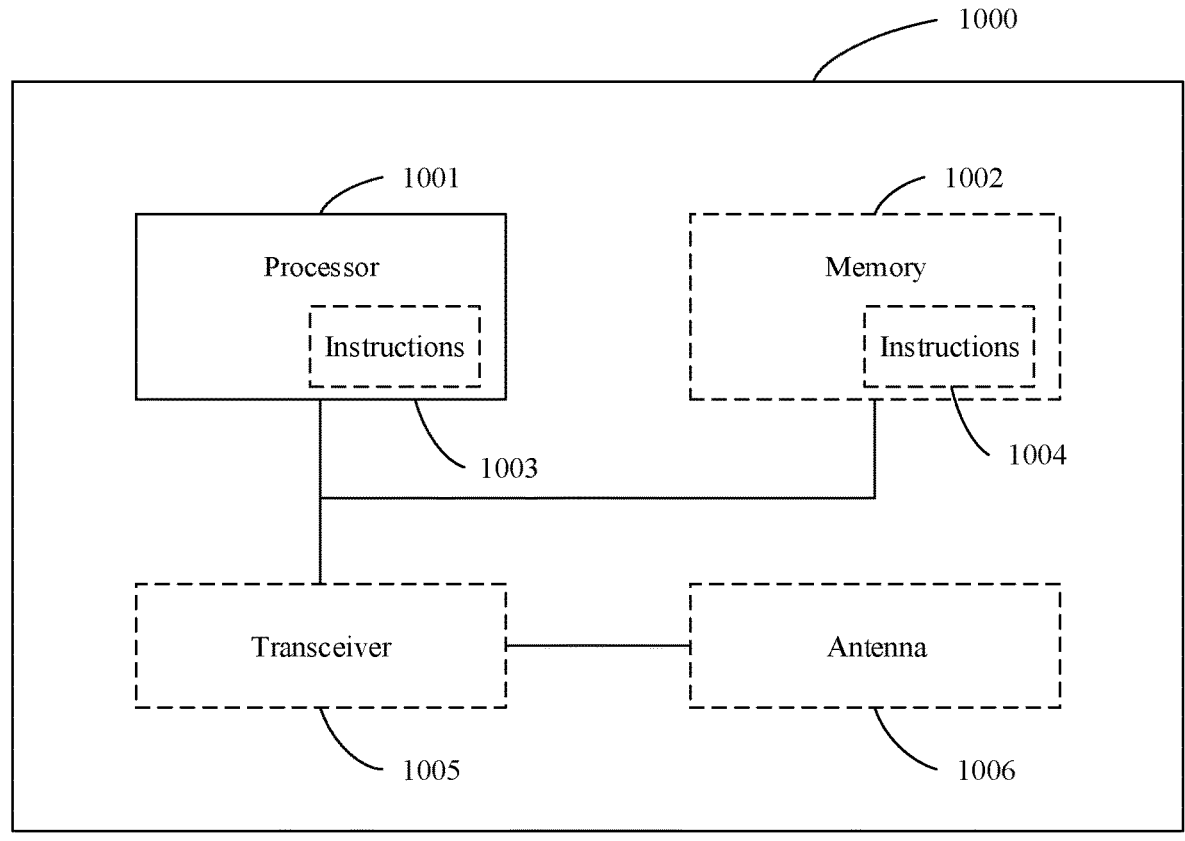
FIG. 10 is a schematic diagram of an architecture of a communication apparatus according to an embodiment of this application.

As shown in FIG. 10, an embodiment of this application further provides a communication apparatus 1000. The apparatus 1000 may be configured to implement the methods described in the foregoing method embodiments. For details, refer to the descriptions in the foregoing method embodiments.

The apparatus 1000 includes one or more processors 1001. The processor 1001 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) a signal. For example, the transceiver unit may be a transceiver or a radio frequency chip.

The apparatus 1000 includes the one or more processors 1001, and the one or more processors 1001 may implement the method in the foregoing embodiments.

Optionally, the processor 1001 may further implement another function in addition to the method in the foregoing embodiments.

Optionally, in a design, the processor 1001 may execute instructions, so that the apparatus 1000 performs the method described in the foregoing method embodiments. All or some of the instructions, for example, instructions 1003, may be stored in the processor, or all or some of the instructions, for example, instructions 1004, may be stored in a memory 1002 coupled to the processor. Alternatively, the apparatus 1000 may be enabled, by using both the instructions 1003 and the instructions 1004, to perform the method described in the foregoing method embodiments.

In another possible design, the communication apparatus 1000 may further include a circuit, and the circuit may implement a function in the foregoing method embodiments.

In still another possible design, the apparatus 1000 may include one or more memories 1002. The memory stores instructions 1004, and the instructions may be run on the processor, so that the apparatus 1000 performs the method described in the foregoing method embodiments. Optionally, the memory may further store data. Optionally, the processor may also store instructions and/or data. For example, the one or more memories 1002 may store the correspondence described in the foregoing embodiments, or the related parameter or table in the foregoing embodiments. The processor and the memory may be separately disposed, or may be integrated together.

In yet another possible design, the apparatus 1000 may further include a transceiver 1005 and an antenna 1006. The processor 1001 may be referred to as a processing unit, and controls the apparatus (a terminal or a base station). The transceiver 1005 may be referred to as a transceiver, a transceiver circuit, the transceiver unit, or the like, and is configured to implement a transceiver function of the apparatus through the antenna 1006.

It should be noted that, the processor in embodiments of this application may be an integrated circuit chip, and has a signal processing capability. In an implementation process, the steps in the foregoing method embodiments may be completed by using a hardware integrated logic circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification includes but is not limited to these and any memory of another proper type.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by software, hardware, firmware, or any combination thereof. When the software is used for implementation, all or some of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (Digital Video Disc, DVD)), a semiconductor medium (for example, a solid-state drive (Solid State Disk, SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general-purpose processor. The general-purpose processor is implemented by reading software code stored in a memory. The memory may be integrated into the processor, or may be located outside the processor and exist independently.

Persons of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of technical solutions. Persons skilled in the art may use different methods to implement the described functions for each particular application, but it should not be considered that the implementation goes beyond the scope of this application.

It may be clearly understood by persons skilled in the art that, for ease and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts displayed as units may or may not be physical units, in other words, may be located in one location, or may be distributed on a plurality of network units. Some or all of the units may be selected based on an actual requirement to achieve the objectives of the solutions in embodiments of this application.

In addition, functional units in embodiments of this application may be integrated into one processing unit, each of the functional units may exist alone physically, or two or more units may be integrated into one unit. The integrated unit may be implemented in a form of hardware, or may be implemented in a form of a software functional unit.

With descriptions of the foregoing implementations, persons skilled in the art may clearly understand that this application may be implemented by hardware, firmware, or a combination thereof. When the software is used for implementation, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium that can be accessed by a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in an instruction form or in a data structure form and can be accessed by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared, radio and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination should also be included in the protection scope of the computer-readable medium.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, applied in a terminal device or a chip thereof, wherein the method comprises:
   receiving positioning reference signal configuration information, wherein the positioning reference signal configuration information comprises at least one of a physical cell identifier or a cell global identifier;
   determining whether a first condition is satisfied; and
   in response to determining that the first condition is satisfied, determining that a positioning reference signal corresponding to the positioning reference signal configuration information is from a serving cell, wherein the first condition comprises: one or more of the physical cell identifier, the cell global identifier, or an absolute radio frequency channel number (ARFCN) that are associated with a downlink positioning reference signal ID of the positioning reference signal are respectively same as one or more of corresponding physical cell identifier, global cell identifier, or ARFCN of the serving cell.

2. The method according to claim 1, wherein the first condition is satisfied when one of the following conditions are satisfied:
   the positioning reference signal configuration information comprises the physical cell identifier and the physical cell identifier is same as a physical cell identifier of the serving cell;
   the positioning reference signal configuration information comprises the cell global identifier and the cell global identifier is same as a cell global identifier of the serving cell;
   the positioning reference signal configuration information comprises the physical cell identifier and the cell global identifier, the physical cell identifier is same as a physical cell identifier of the serving cell, and the cell global identifier is same as a cell global identifier of the serving cell;
   the positioning reference signal configuration information comprises the physical cell identifier and an absolute radio frequency channel number, the physical cell identifier is same as a physical cell identifier of the serving cell, and the absolute radio frequency channel number is same as an absolute radio frequency channel number of the serving cell;
   the positioning reference signal configuration information comprises the cell global identifier and an absolute radio frequency channel number, the cell global identifier is same as a cell global identifier of the serving cell, and the absolute radio frequency channel number is same as an absolute radio frequency channel number of the serving cell; or
   the positioning reference signal configuration information comprises the physical cell identifier, the cell global identifier, and an absolute radio frequency channel number, the physical cell identifier is same as a physical cell identifier of the serving cell, the cell global identifier is same as a cell global identifier of the serving cell, and the absolute radio frequency channel number is same as an absolute radio frequency channel number of the serving cell.

3. The method according to claim 1, wherein the method further comprises:
   in response to determining that the first condition is not satisfied, determining that a positioning reference signal corresponding to the positioning reference signal configuration information is from a non-serving cell.

4. The method according to claim 3, wherein the method further comprises:

receiving first signal configuration information, wherein the first signal configuration information comprises a physical cell identifier; and in response to determining that the physical cell identifier comprised in the positioning reference signal configuration information is same as the physical cell identifier comprised in the first signal configuration information, and a band on which the positioning reference signal is located is same as a band on which a first signal corresponding to the first signal configuration information is located, determining that the positioning reference signal and the first signal are from a same non-serving cell.

5. The method according to claim 1, wherein the first signal is a synchronization signal block.

6. The method according to claim 1, wherein the method further comprises:

receiving first signal configuration information, wherein the first signal configuration information comprises a physical cell identifier; and in response to determining that the physical cell identifier corresponding to the positioning reference signal is same as the physical cell identifier comprised in the first signal configuration information, determining that the positioning reference signal and a first signal corresponding to the first signal configuration information are from a same serving cell.

7. The method according to claim 1, wherein the method further comprises:

receiving first signal configuration information, wherein the first signal configuration information comprises a physical cell identifier; and in response to determining that the physical cell identifier corresponding to the positioning reference signal is same as the physical cell identifier comprised in the first signal configuration information, and a band on which the positioning reference signal is located is same as a band on which a first signal corresponding to the first signal configuration information is located, determining that the positioning reference signal and the first signal are from a same serving cell.

8. An apparatus, comprising:

at least one processor, wherein the at least one processor is configured to execute programming instructions to cause the apparatus to:

receive positioning reference signal configuration information, wherein the positioning reference signal configuration information comprises at least one of a physical cell identifier or a cell global identifier;

determine whether a first condition is satisfied; and in response to determining that the first condition is satisfied, determine that a positioning reference signal corresponding to the positioning reference signal configuration information is from a serving cell, wherein the first condition comprises: one or more of the physical cell identifier, the cell global identifier, or an absolute radio frequency channel number (ARFCN) that are associated with a downlink positioning reference signal ID of the positioning reference signal are respectively same as one or more of corresponding physical cell identifier, global cell identifier, or ARFCN of the serving cell.

9. The apparatus according to claim 8, wherein the first condition is satisfied when one or more of the following conditions are satisfied:

the positioning reference signal configuration information comprises the physical cell identifier and the physical cell identifier is same as a physical cell identifier of the serving cell;

the positioning reference signal configuration information comprises the cell global identifier and the cell global identifier is same as a cell global identifier of the serving cell;

the positioning reference signal configuration information comprises the physical cell identifier and the cell global identifier, the physical cell identifier is same as a physical cell identifier of the serving cell, and the cell global identifier is same as a cell global identifier of the serving cell;

the positioning reference signal configuration information comprises the physical cell identifier and an absolute radio frequency channel number, the physical cell identifier is same as a physical cell identifier of the serving cell, and the absolute radio frequency channel number is same as an absolute radio frequency channel number of the serving cell;

the positioning reference signal configuration information comprises the cell global identifier and an absolute radio frequency channel number, the cell global identifier is same as a cell global identifier of the serving cell, and the absolute radio frequency channel number is same as an absolute radio frequency channel number of the serving cell; or the positioning reference signal configuration information comprises the physical cell identifier, the cell global identifier, and an absolute radio frequency channel number, the physical cell identifier is same as a physical cell identifier of the serving cell, the cell global identifier is same as a cell global identifier of the serving cell, and the absolute radio frequency channel number is same as an absolute radio frequency channel number of the serving cell.

10. The apparatus according to claim 8, the programming instructions are for execution by the at least one processor to:

in response to determining that the first condition is not satisfied, determine that a positioning reference signal corresponding to the positioning reference signal configuration information is from a non-serving cell.

11. The apparatus according to claim 10, the programming instructions are for execution by the at least one processor to:

receive first signal configuration information, wherein the first signal configuration information comprises a physical cell identifier; and in response to determining that the physical cell identifier comprised in the positioning reference signal configuration information is same as the physical cell identifier comprised in the first signal configuration information, and a band on which the positioning reference signal is located is same as a band on which a first signal corresponding to the first signal configuration information is located, determine that the positioning reference signal and the first signal are from a same non-serving cell.

12. The apparatus according to claim 11, wherein the first signal is a synchronization signal block.

13. The apparatus according to claim 8, the programming instructions are for execution by the at least one processor to:

receive first signal configuration information, wherein the first signal configuration information comprises a physical cell identifier; and in response to determining that the physical cell identifier corresponding to the positioning reference signal is same as the physical cell identifier comprised in the first signal configuration information, determine that the positioning reference signal and a first signal corresponding to the first signal configuration information are from a same serving cell.

14. The apparatus according to claim 8, the programming instructions are for execution by the at least one processor to:

receive first signal configuration information, wherein the first signal configuration information comprises a physical cell identifier; and in response to determining that the physical cell identifier corresponding to the positioning reference signal is same as the physical cell identifier comprised in the first signal configuration information, and a band on which the positioning reference signal is located is same as a band on which a first signal corresponding to the first signal configuration information is located, determine that the positioning reference signal and the first signal are from a same serving cell.

15. A non-transitory computer-readable medium, storing computer instructions that, when executed by a terminal device, cause the terminal device to perform operations comprising:

receiving positioning reference signal configuration information, wherein the positioning reference signal configuration information comprises at least one of a physical cell identifier or a cell global identifier;

determining whether a first condition is satisfied; and in response to determining that the first condition is satisfied, determining that a positioning reference signal corresponding to the positioning reference signal configuration information is from a serving cell, wherein the first condition comprises: one or more of the physical cell identifier, the cell global identifier, or an absolute radio frequency channel number (ARFCN) that are associated with a downlink positioning reference signal ID of the positioning reference signal are respectively same as one or more of corresponding physical cell identifier, global cell identifier, or ARFCN of the serving cell.

16. The non-transitory computer-readable medium according to claim 15, wherein the first condition is satisfied when one or more of the following conditions are satisfied:

the positioning reference signal configuration information comprises the physical cell identifier and the physical cell identifier is same as a physical cell identifier of the serving cell;

the positioning reference signal configuration information comprises the cell global identifier and the cell global identifier is same as a cell global identifier of the serving cell;

the positioning reference signal configuration information comprises the physical cell identifier and the cell global identifier, the physical cell identifier is same as a physical cell identifier of the serving cell, and the cell global identifier is same as a cell global identifier of the serving cell;

the positioning reference signal configuration information comprises the physical cell identifier and an absolute radio frequency channel number, the physical cell identifier is same as a physical cell identifier of the serving cell, and the absolute radio frequency channel number is same as an absolute radio frequency channel number of the serving cell;

the positioning reference signal configuration information comprises the cell global identifier and an absolute radio frequency channel number, the cell global identifier is same as a cell global identifier of the serving cell, and the absolute radio frequency channel number is same as an absolute radio frequency channel number of the serving cell; or the positioning reference signal configuration information comprises the physical cell identifier, the cell global identifier, and an absolute radio frequency channel number, the physical cell identifier is same as a physical cell identifier of the serving cell, the cell global identifier is same as a cell global identifier of the serving cell, and the absolute radio frequency channel number is same as an absolute radio frequency channel number of the serving cell.

17. The non-transitory computer-readable medium according to claim 15, wherein the operations further comprising:

in response to determining that the first condition is not satisfied, determining that a positioning reference signal corresponding to the positioning reference signal configuration information is from a non-serving cell.

18. The non-transitory computer-readable medium according to claim 17, wherein the operations further comprising:

receiving first signal configuration information, wherein the first signal configuration information comprises a physical cell identifier; and in response to determining that the physical cell identifier comprised in the positioning reference signal configuration information is same as the physical cell identifier comprised in the first signal configuration information, and a band on which the positioning reference signal is located is same as a band on which a first signal corresponding to the first signal configuration information is located, determining that the positioning reference signal and the first signal are from a same non-serving cell.

19. The non-transitory computer-readable medium according to claim 18, wherein the first signal is a synchronization signal block.

20. The non-transitory computer-readable medium according to claim 15, wherein the operations further comprising:

receiving, by the terminal device, first signal configuration information, wherein the first signal configuration information comprises a physical cell identifier; and in response to determining that the physical cell identifier corresponding to the positioning reference signal is same as the physical cell identifier comprised in the first signal configuration information, determining that the positioning reference signal and a first signal corresponding to the first signal configuration information are from a same serving cell.

* * * * *